US008811320B2

(12) United States Patent
Inohiza

(10) Patent No.: US 8,811,320 B2
(45) Date of Patent: Aug. 19, 2014

(54) WIRELESS COMMUNICATION PATH SELECTION METHOD AND SELECTION APPARATUS

(75) Inventor: Hirohiko Inohiza, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 13/403,595

(22) Filed: Feb. 23, 2012

(65) Prior Publication Data

US 2012/0224542 A1    Sep. 6, 2012

(30) Foreign Application Priority Data

Mar. 3, 2011    (JP) ................................. 2011-046970

(51) Int. Cl.
*H04W 4/00* (2009.01)
(52) U.S. Cl.
USPC ............................ 370/329; 370/310; 370/252
(58) Field of Classification Search
USPC .......... 370/310, 338, 328, 329; 455/147, 447, 455/515, 63.1, 63.2
See application file for complete search history.

(56) References Cited

U.S. PATENT DOCUMENTS

| 7,706,787 | B2 * | 4/2010 | Malarky et al. | 455/429 |
|---|---|---|---|---|
| 8,270,375 | B2 * | 9/2012 | Ylitalo | 370/334 |
| 8,456,374 | B1 * | 6/2013 | Bagley et al. | 343/810 |
| 2003/0146880 | A1 * | 8/2003 | Chiang et al. | 343/853 |
| 2004/0259556 | A1 * | 12/2004 | Czys | 455/447 |
| 2006/0182193 | A1 * | 8/2006 | Monsen | 375/267 |
| 2008/0218412 | A1 * | 9/2008 | Wales | 342/361 |
| 2008/0297414 | A1 * | 12/2008 | Krishnaswamy et al. | 342/368 |
| 2009/0058725 | A1 * | 3/2009 | Barker et al. | 342/372 |
| 2010/0159832 | A1 | 6/2010 | Lagrange et al. | |
| 2011/0299570 | A1 * | 12/2011 | Reed | 375/130 |
| 2011/0306306 | A1 * | 12/2011 | Reed | 455/67.11 |

FOREIGN PATENT DOCUMENTS

| CN | 1379558 A | 11/2002 |
|---|---|---|
| CN | 1381999 A | 11/2002 |
| CN | 1413039 A | 4/2003 |
| CN | 101411087 A | 4/2009 |
| EP | 1841092 A | 10/2007 |
| EP | 2197238 A | 6/2010 |
| JP | 08-321799 A | 12/1996 |
| WO | 2010/072593 A | 7/2010 |
| WO | 2010/094000 A | 8/2010 |
| WO | 2010/103744 A | 9/2010 |

OTHER PUBLICATIONS

European Search Report dated Jun. 19, 2012 issued in corresponding European Application No. 12156682.2.
Chinese Office Action issued in corresponding application No. 201210052594.1 on May 9, 2014.

* cited by examiner

*Primary Examiner* — Abdullah Riyami
(74) *Attorney, Agent, or Firm* — Carter, DeLuca, Farrell & Schmidt, LLP

(57) ABSTRACT

Communication bands occupied by wireless communication paths extending from a source node to a destination node are determined, and a combination of wireless communication paths is selected based on spatial distances between wireless communication paths from combinations of wireless communication paths in each of which the number of communication bands with respect to a combination of wireless communication paths is smaller than a threshold.

12 Claims, 28 Drawing Sheets

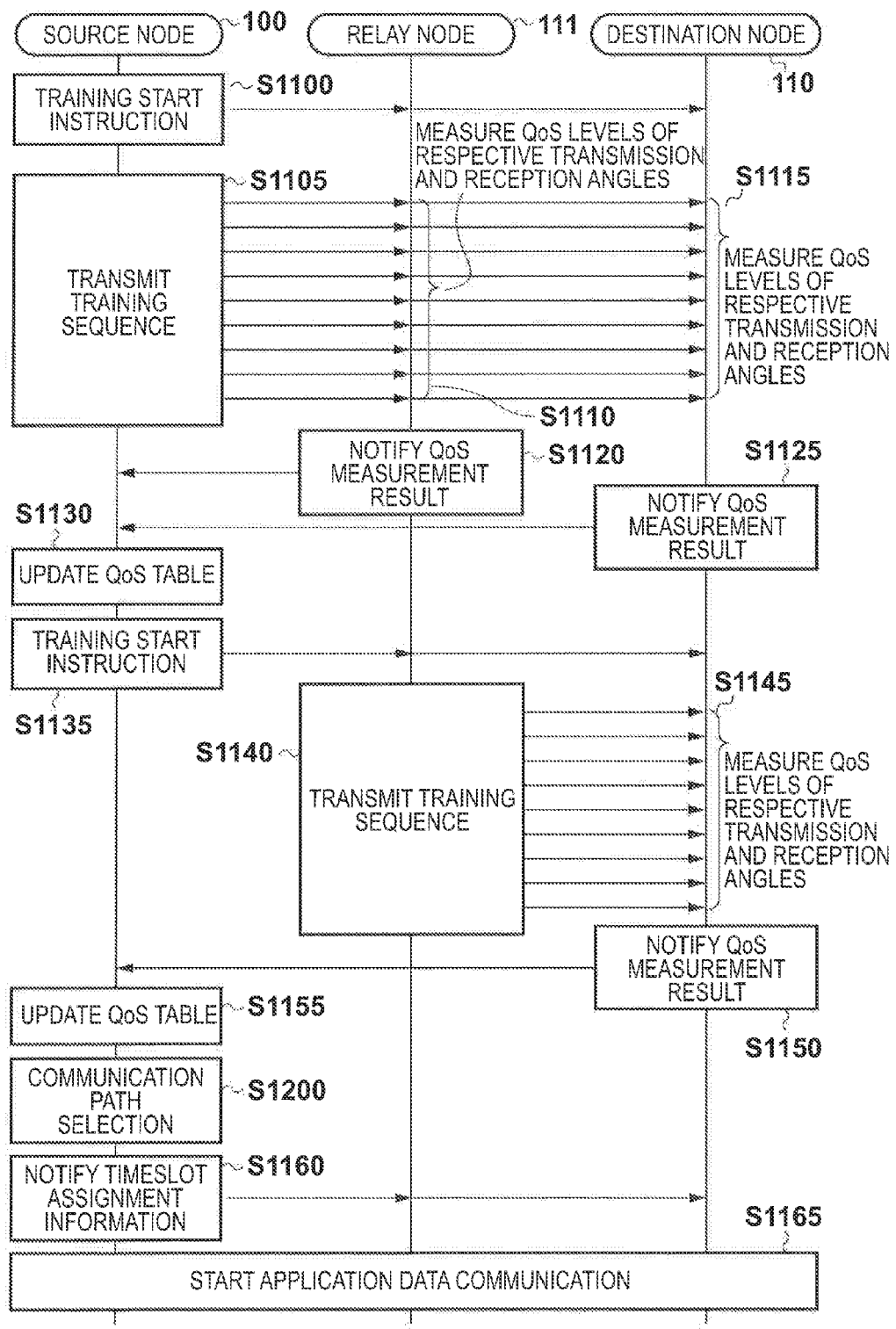

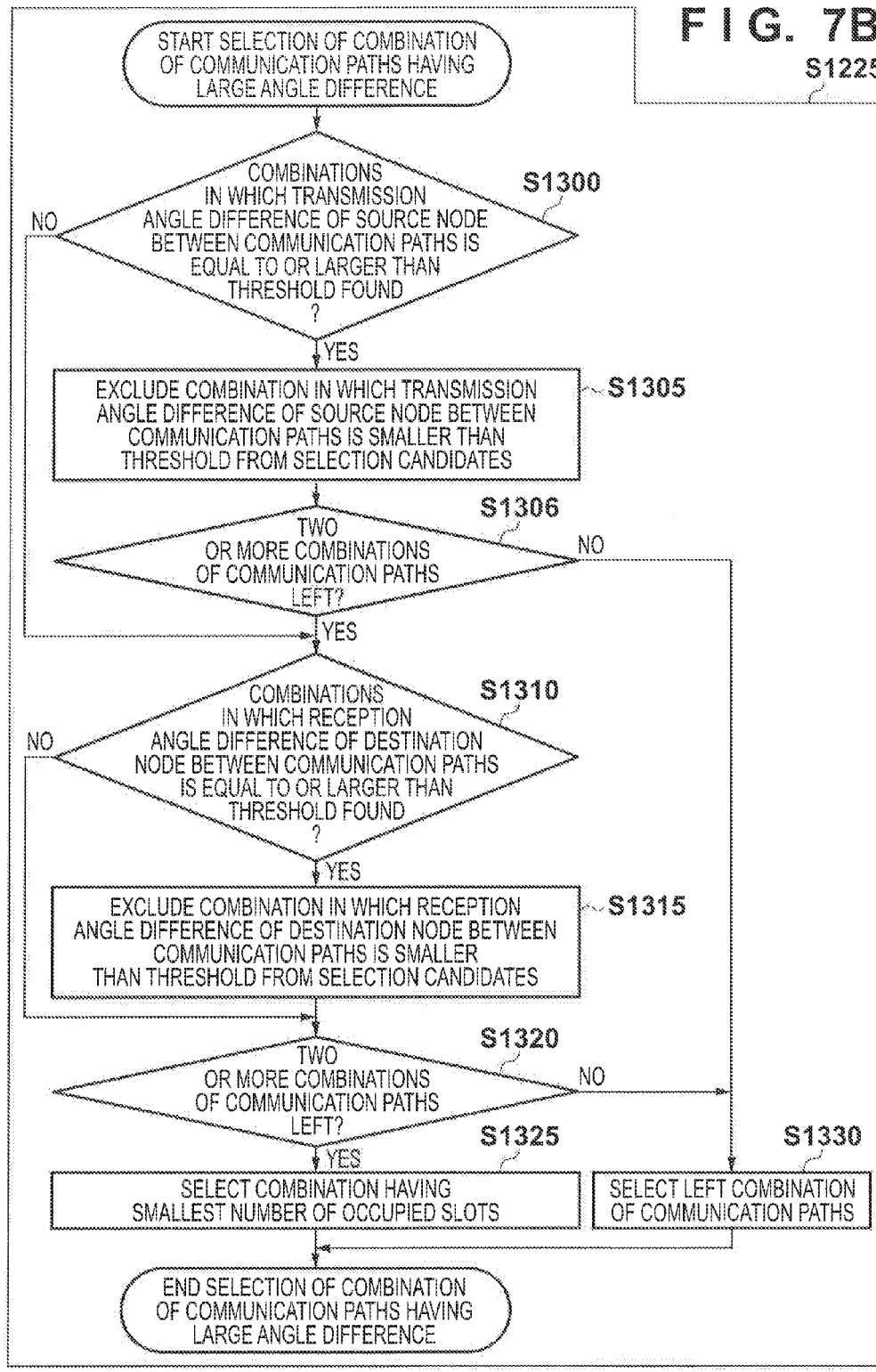

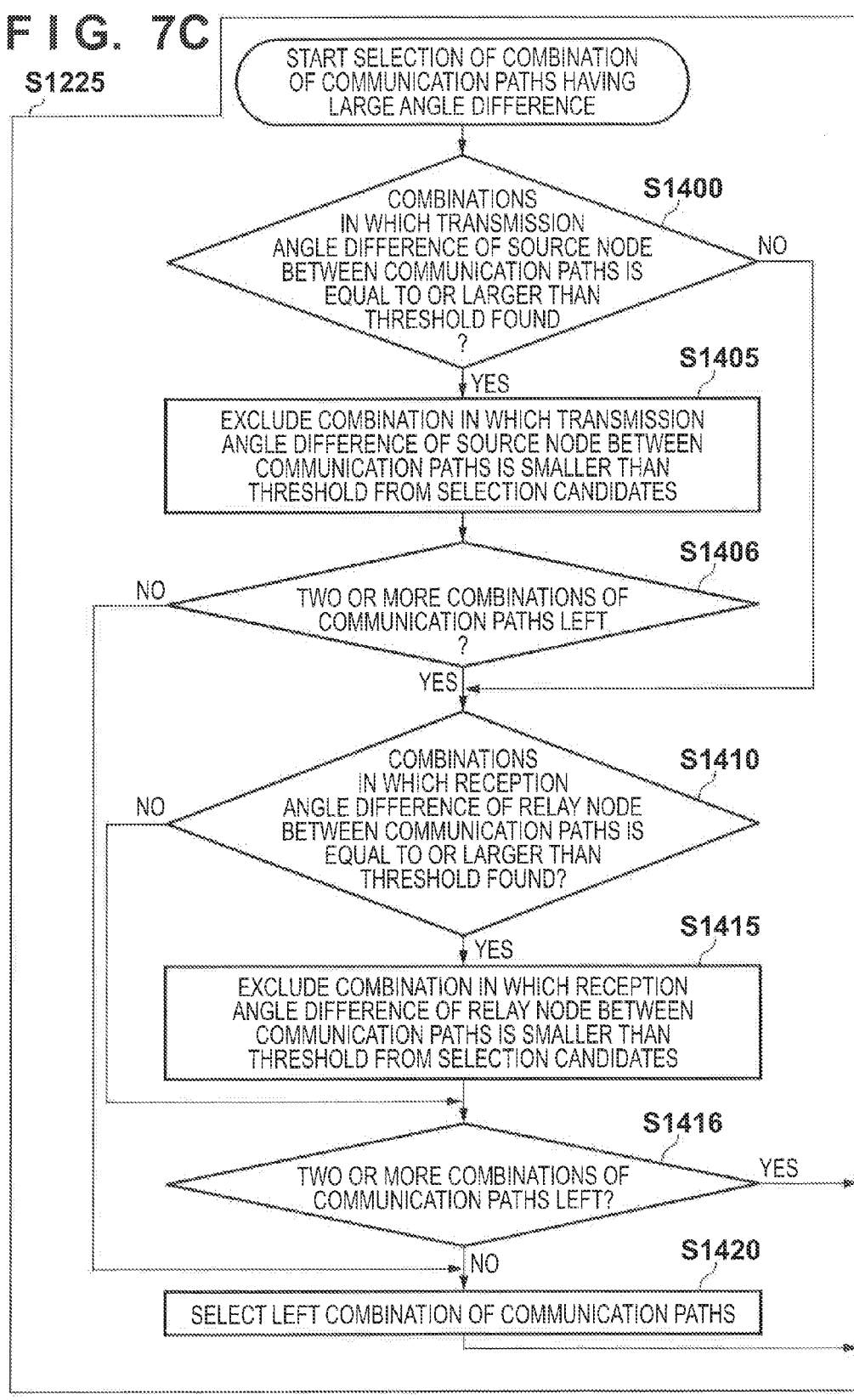

FIG. 8

| SOURCE NODE TRANSMISSION ANGLE | DESTINATION NODE RECEPTION ANGLE | | | | | | | | | | |
|---|---|---|---|---|---|---|---|---|---|---|---|
| | | 15 | 30 | 45 | 60 | 75 | 90 | 105 | 120 | 135 | 150 | 165 |
| | 15 | NA | NA | NA | NA | NA | NA | NA | NA | NA | NA | NA |
| | 30 | NA | 2 | NA | NA | NA | NA | NA | NA | NA | NA | NA |
| | 45 | NA | NA | NA | NA | NA | NA | NA | NA | NA | NA | NA |
| | 60 | NA | NA | NA | NA | NA | NA | NA | 7 | NA | NA | NA |
| | 75 | NA | NA | NA | NA | NA | NA | NA | NA | NA | NA | NA |
| | 90 | NA | NA | NA | NA | NA | 9 | NA | NA | NA | NA | NA |
| | 105 | NA | NA | NA | NA | NA | NA | NA | NA | NA | NA | NA |
| | 120 | NA | NA | NA | NA | NA | NA | NA | NA | NA | NA | NA |
| | 135 | NA | NA | 5 | NA | NA | NA | NA | NA | NA | NA | NA |
| | 150 | NA | NA | NA | NA | NA | NA | NA | NA | NA | NA | NA |
| | 165 | NA | NA | NA | NA | NA | NA | NA | NA | NA | NA | NA |

FIG. 9

| QoS LEVEL | MODULATION METHOD | NUMBER OF OCCUPIED SLOTS |
|---|---|---|
| 1~2 | BPSK | 6 |
| 3~5 | QPSK | 4 |
| 6~8 | 8PSK | 3 |
| 9~10 | 16QAM | 2 |

FIG. 10

| LINK NO. | SOURCE TRANSMISSION ANGLE | DESTINATION RECEPTION ANGLE | MODULATION METHOD | NUMBER OF OCCUPIED SLOTS |
|---|---|---|---|---|
| LINK 1 | 30 | 30 | BPSK | 6 |
| LINK 2 | 60 | 120 | 8PSK | 3 |
| LINK 3 | 90 | 90 | 16QAM | 2 |
| LINK 4 | 135 | 45 | QPSK | 4 |

F I G. 11

| COMMUNICATION PATH NO. | LINK TO BE USED | SOURCE TRANSMISSION ANGLE | DESTINATION RECEPTION ANGLE | NUMBER OF OCCUPIED SLOTS |
|---|---|---|---|---|
| PATH 1 | LINK 1 | 30 | 30 | 6 |
| PATH 2 | LINK 2 | 60 | 120 | 3 |
| PATH 3 | LINK 3 | 90 | 90 | 2 |
| PATH 4 | LINK 4 | 135 | 45 | 4 |

F I G. 12A

| NO. | COMBINATION OF COMMUNICATION PATHS | | NUMBER OF OCCUPIED SLOTS |
|---|---|---|---|
| 1 | PATH 1 | PATH 2 | 9 |
| 2 | PATH 1 | PATH 3 | 8 |
| 3 | PATH 1 | PATH 4 | 10 |
| 4 | PATH 2 | PATH 3 | 5 |
| 5 | PATH 2 | PATH 4 | 7 |
| 6 | PATH 3 | PATH 4 | 6 |

F I G. 12B

| NO. | COMBINATION OF PATHS | | NUMBER OF OCCUPIED SLOTS | TRANSMISSION ANGLE DIFFERENCE | RECEPTION ANGLE DIFFERENCE |
|---|---|---|---|---|---|
| 2 | PATH 1 | PATH 3 | 8 | 60 | 60 |
| 4 | PATH 2 | PATH 3 | 5 | 30 | 30 |
| 5 | PATH 2 | PATH 4 | 7 | 75 | 75 |
| 6 | PATH 3 | PATH 4 | 6 | 45 | 45 |

F I G. 15

|  | DESTINATION NODE RECEPTION ANGLE ||||||||||||
|---|---|---|---|---|---|---|---|---|---|---|---|---|
|  |  | 15 | 30 | 45 | 60 | 75 | 90 | 105 | 120 | 135 | 150 | 165 |
| SOURCE NODE TRANSMISSION ANGLE | Wide | NA | NA | 3 | NA | NA | 8 | NA | 5 | NA | NA | NA |

F I G. 16

| LINK NO. | SOURCE TRANSMISSION ANGLE | DESTINATION RECEPTION ANGLE | MODULATION METHOD | NUMBER OF OCCUPIED SLOTS |
|---|---|---|---|---|
| LINK 1 | Wide | 30 | QPSK | 4 |
| LINK 2 | Wide | 90 | 8PSK | 3 |
| LINK 3 | Wide | 120 | QPSK | 4 |

F I G. 17

| PATH NO. | LINK TO BE USED | SOURCE TRANSMISSION ANGLE | DESTINATION RECEPTION ANGLE | NUMBER OF OCCUPIED SLOTS |
|---|---|---|---|---|
| PATH 1 | LINK 1 | Wide | 45 | 4 |
| PATH 2 | LINK 2 | Wide | 90 | 3 |
| PATH 3 | LINK 3 | Wide | 120 | 4 |

F I G. 18

| NO. | COMBINATION OF PATHS || NUMBER OF OCCUPIED SLOTS | TRANSMISSION ANGLE DIFFERENCE | RECEPTION ANGLE DIFFERENCE |
|---|---|---|---|---|---|
| 1 | PATH 1 | PATH 2 | 7 | 0 | 45 |
| 2 | PATH 1 | PATH 3 | 8 | 0 | 75 |
| 3 | PATH 2 | PATH 3 | 7 | 0 | 30 |

F I G. 21
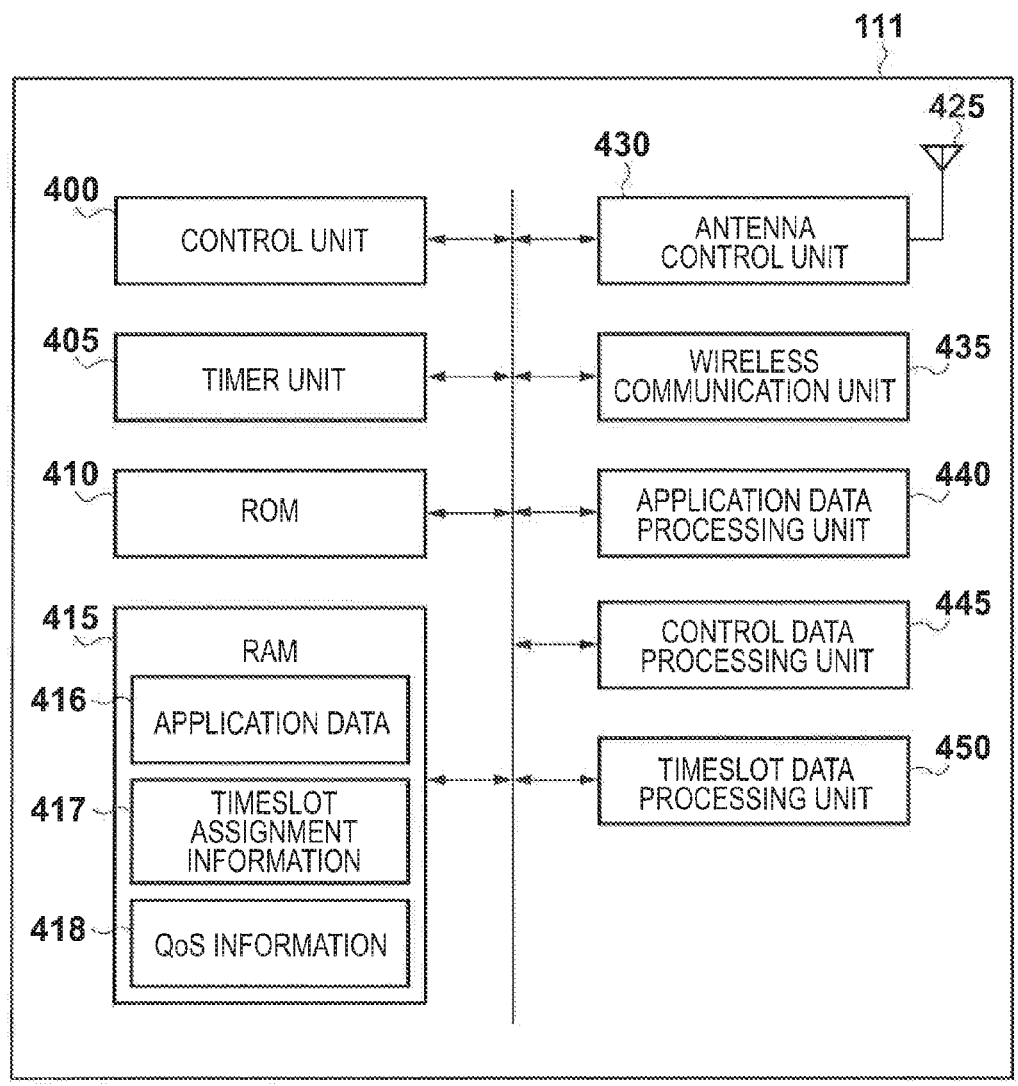

FIG. 22

|  | DESTINATION NODE RECEPTION ANGLE | | | | | | | | | | |
|---|---|---|---|---|---|---|---|---|---|---|---|
|  | 15 | 30 | 45 | 60 | 75 | 90 | 105 | 120 | 135 | 150 | 165 |
| SOURCE NODE TRANSMISSION ANGLE — 15 | NA | NA | NA | NA | NA | NA | NA | NA | NA | NA | NA |
| 30 | NA | NA | NA | NA | NA | NA | NA | NA | NA | NA | NA |
| 45 | NA | NA | NA | NA | NA | NA | NA | NA | NA | NA | NA |
| 60 | NA | NA | NA | NA | NA | NA | NA | 5 | NA | NA | NA |
| 75 | NA | NA | NA | NA | NA | NA | NA | NA | NA | NA | NA |
| 90 | NA | NA | NA | NA | NA | 8 | NA | NA | NA | NA | NA |
| 105 | NA | NA | NA | NA | NA | NA | NA | NA | NA | NA | NA |
| 120 | NA | NA | NA | NA | NA | NA | NA | NA | NA | NA | NA |
| 135 | NA | NA | NA | NA | NA | NA | NA | NA | NA | NA | NA |
| 150 | NA | NA | NA | NA | NA | NA | NA | NA | NA | NA | NA |
| 165 | NA | NA | NA | NA | NA | NA | NA | NA | NA | NA | NA |

|  | RELAY NODE RECEPTION ANGLE | | | | | | | | | | |
|---|---|---|---|---|---|---|---|---|---|---|---|
|  | 15 | 30 | 45 | 60 | 75 | 90 | 105 | 120 | 135 | 150 | 165 |
| SOURCE NODE TRANSMISSION ANGLE — 15 | NA | NA | NA | NA | NA | NA | NA | NA | NA | NA | NA |
| 30 | NA | NA | NA | NA | NA | NA | NA | NA | NA | NA | NA |
| 45 | NA | NA | NA | NA | NA | NA | NA | NA | NA | NA | NA |
| 60 | NA | NA | NA | NA | NA | NA | NA | NA | NA | NA | NA |
| 75 | NA | NA | NA | NA | NA | NA | NA | NA | NA | NA | NA |
| 90 | NA | NA | NA | NA | NA | NA | NA | NA | NA | NA | NA |
| 105 | NA | NA | NA | NA | NA | NA | NA | NA | NA | NA | NA |
| 120 | NA | NA | NA | NA | NA | NA | NA | NA | NA | NA | NA |
| 135 | NA | NA | 10 | NA | NA | NA | NA | NA | NA | NA | NA |
| 150 | NA | NA | NA | NA | NA | NA | NA | NA | NA | NA | NA |
| 165 | NA | NA | NA | NA | NA | NA | NA | NA | NA | NA | NA |

|  | DESTINATION NODE RECEPTION ANGLE | | | | | | | | | | |
|---|---|---|---|---|---|---|---|---|---|---|---|
|  | 15 | 30 | 45 | 60 | 75 | 90 | 105 | 120 | 135 | 150 | 165 |
| RELAY NODE TRANSMISSION ANGLE — 15 | NA | NA | NA | NA | NA | NA | NA | NA | NA | NA | NA |
| 30 | NA | NA | NA | NA | NA | NA | NA | NA | NA | NA | NA |
| 45 | NA | NA | NA | NA | NA | NA | NA | NA | NA | NA | NA |
| 60 | NA | NA | NA | NA | NA | NA | NA | NA | NA | NA | NA |
| 75 | NA | NA | NA | NA | NA | NA | NA | NA | NA | NA | NA |
| 90 | NA | NA | NA | NA | NA | NA | NA | NA | NA | NA | NA |
| 105 | NA | NA | NA | NA | NA | NA | NA | NA | NA | NA | NA |
| 120 | NA | NA | NA | NA | NA | NA | NA | NA | NA | NA | NA |
| 135 | NA | NA | 7 | NA | NA | NA | NA | NA | NA | NA | NA |
| 150 | NA | NA | NA | NA | NA | NA | NA | NA | NA | NA | NA |
| 165 | NA | NA | NA | NA | NA | NA | NA | NA | NA | NA | NA |

F I G. 23

| LINK NO. | TRANSMITTING NODE | RECEIVING NODE | TRANSMISSION ANGLE | RECEPTION ANGLE | MODULATION METHOD | NUMBER OF OCCUPIED SLOTS |
|---|---|---|---|---|---|---|
| LINK 1 | SOURCE | DESTINATION | 60 | 120 | QPSK | 4 |
| LINK 2 | SOURCE | DESTINATION | 90 | 90 | 8PSK | 3 |
| LINK 3 | SOURCE | RELAY | 135 | 45 | 16QAM | 2 |
| LINK 4 | RELAY | DESTINATION | 135 | 45 | 8PSK | 3 |

F I G. 24

| PATH NO. | LINK TO BE USED | SOURCE TRANSMISSION ANGLE | RELAY RECEPTION ANGLE | RELAY TRANSMISSION ANGLE | DESTINATION RECEPTION ANGLE | NUMBER OF OCCUPIED SLOTS |
|---|---|---|---|---|---|---|
| PATH 1 | LINK 1 | 60 | | | 120 | 4 |
| PATH 2 | LINK 2 | 90 | | | 90 | 3 |
| PATH 3 | LINKS 3+4 | 135 | 45 | 135 | 45 | 5 |

F I G. 25A

| NO. | COMBINATION OF PATHS | | NUMBER OF OCCUPIED SLOTS |
|---|---|---|---|
| 1 | PATH 1 | PATH 2 | 7 |
| 2 | PATH 1 | PATH 3 | 9 |
| 3 | PATH 2 | PATH 3 | 8 |

F I G. 25B

| NO. | COMBINATION OF PATHS | | NUMBER OF OCCUPIED SLOTS | SOURCE NODE TRANSMISSION ANGLE DIFFERENCE | DESTINATION NODE RECEPTION ANGLE DIFFERENCE |
|---|---|---|---|---|---|
| 1 | PATH 1 | PATH 2 | 7 | 30 | 30 |
| 3 | PATH 2 | PATH 3 | 8 | 45 | 45 |

FIG. 28

| | | DESTINATION NODE RECEPTION ANGLE | | | | | | | | | | |
|---|---|---|---|---|---|---|---|---|---|---|---|---|
| | | 15 | 30 | 45 | 60 | 75 | 90 | 105 | 120 | 135 | 150 | 165 |
| SOURCE NODE TRANSMISSION ANGLE | 15 | NA | NA | NA | NA | NA | NA | NA | NA | NA | NA | NA |
| | 30 | NA | NA | NA | NA | NA | NA | NA | NA | NA | NA | NA |
| | 45 | NA | NA | NA | NA | NA | NA | NA | NA | NA | NA | NA |
| | 60 | NA | NA | NA | NA | NA | NA | NA | NA | NA | NA | NA |
| | 75 | NA | NA | NA | NA | NA | NA | NA | NA | NA | NA | NA |
| | 90 | NA | NA | NA | NA | NA | NA | NA | NA | NA | NA | NA |
| | 105 | NA | NA | NA | NA | NA | NA | NA | NA | NA | NA | NA |
| | 120 | NA | NA | NA | NA | NA | NA | NA | NA | NA | NA | NA |
| | 135 | NA | NA | NA | NA | NA | NA | NA | NA | NA | NA | NA |
| | 150 | NA | NA | NA | NA | NA | NA | NA | NA | NA | NA | NA |
| | 165 | NA | NA | NA | NA | NA | NA | NA | NA | NA | NA | NA |

| | | RELAY NODE RECEPTION ANGLE | | | | | | | | | | |
|---|---|---|---|---|---|---|---|---|---|---|---|---|
| | | 15 | 30 | 45 | 60 | 75 | 90 | 105 | 120 | 135 | 150 | 165 |
| SOURCE NODE TRANSMISSION ANGLE | 15 | NA | NA | NA | NA | NA | NA | NA | NA | NA | NA | NA |
| | 30 | NA | NA | NA | NA | NA | NA | NA | NA | NA | NA | NA |
| | 45 | NA | NA | NA | NA | NA | NA | NA | NA | NA | NA | NA |
| | 60 | NA | NA | NA | 10 | NA | NA | NA | NA | NA | NA | NA |
| | 75 | NA | NA | NA | NA | NA | NA | NA | NA | NA | NA | NA |
| | 90 | NA | NA | NA | NA | NA | NA | NA | NA | NA | NA | NA |
| | 105 | 9 | NA | NA | NA | NA | NA | NA | NA | NA | NA | NA |
| | 120 | NA | NA | NA | NA | NA | NA | NA | NA | NA | NA | NA |
| | 135 | NA | NA | NA | NA | NA | NA | NA | NA | NA | NA | NA |
| | 150 | NA | NA | NA | NA | NA | NA | NA | NA | NA | NA | NA |
| | 165 | NA | NA | NA | NA | NA | NA | NA | NA | NA | NA | NA |

| | | DESTINATION NODE RECEPTION ANGLE | | | | | | | | | | |
|---|---|---|---|---|---|---|---|---|---|---|---|---|
| | | 15 | 30 | 45 | 60 | 75 | 90 | 105 | 120 | 135 | 150 | 165 |
| RELAY NODE TRANSMISSION ANGLE | 15 | NA | NA | NA | NA | NA | NA | NA | NA | NA | NA | NA |
| | 30 | NA | NA | NA | NA | NA | NA | NA | NA | NA | NA | NA |
| | 45 | NA | NA | NA | NA | NA | NA | NA | NA | NA | NA | NA |
| | 60 | NA | NA | NA | NA | NA | NA | NA | NA | NA | NA | NA |
| | 75 | NA | NA | NA | NA | NA | NA | NA | NA | NA | NA | NA |
| | 90 | NA | NA | NA | NA | NA | 5 | NA | NA | NA | NA | NA |
| | 105 | NA | NA | NA | NA | NA | NA | NA | NA | NA | NA | NA |
| | 120 | NA | NA | NA | NA | NA | NA | NA | NA | NA | NA | NA |
| | 135 | NA | NA | 9 | NA | NA | NA | NA | NA | NA | NA | NA |
| | 150 | NA | NA | NA | NA | NA | NA | NA | NA | NA | NA | NA |
| | 165 | 7 | NA | NA | NA | NA | NA | NA | NA | NA | NA | NA |

F I G. 29

| LINK NO. | TRANSMITTING NODE | RECEIVING NODE | TRANSMISSION ANGLE | RECEPTION ANGLE | MODULATION METHOD | NUMBER OF OCCUPIED SLOTS |
|---|---|---|---|---|---|---|
| LINK 1 | SOURCE | RELAY | 105 | 15 | 16QAM | 2 |
| LINK 2 | SOURCE | RELAY | 60 | 60 | 16QAM | 2 |
| LINK 3 | RELAY | DESTINATION | 165 | 15 | 8PSK | 3 |
| LINK 4 | RELAY | DESTINATION | 90 | 90 | QPSK | 4 |
| LINK 5 | RELAY | DESTINATION | 135 | 45 | 16QAM | 2 |

F I G. 30

| PATH NO. | LINK TO BE USED | SOURCE TRANSMISSION ANGLE | RELAY RECEPTION ANGLE | RELAY TRANSMISSION ANGLE | DESTINATION RECEPTION ANGLE | NUMBER OF OCCUPIED SLOTS |
|---|---|---|---|---|---|---|
| PATH 1 | LINKS 1+3 | 105 | 15 | 165 | 15 | 5 |
| PATH 2 | LINKS 1+4 | 105 | 15 | 90 | 90 | 6 |
| PATH 3 | LINKS 1+5 | 105 | 15 | 135 | 45 | 4 |
| PATH 4 | LINKS 2+3 | 60 | 60 | 165 | 15 | 5 |
| PATH 5 | LINKS 2+4 | 60 | 60 | 90 | 90 | 6 |
| PATH 6 | LINKS 2+5 | 60 | 60 | 135 | 45 | 4 |

FIG. 31A

| NO. | COMBINATION OF PATHS | | LINK TO BE USED | NUMBER OF OCCUPIED SLOTS |
|---|---|---|---|---|
| 1 | PATH 1 | PATH 2 | LINKS 1+3+4 | 11 |
| 2 | PATH 1 | PATH 3 | LINKS 1+3+5 | 9 |
| 3 | PATH 1 | PATH 4 | LINKS 1+2+3 | 10 |
| 4 | PATH 1 | PATH 5 | LINKS 1+2+3+4 | 11 |
| 5 | PATH 1 | PATH 6 | LINKS 1+2+3+5 | 9 |
| 6 | PATH 2 | PATH 3 | LINKS 1+4+5 | 10 |
| 7 | PATH 2 | PATH 4 | LINKS 1+2+3+4 | 11 |
| 8 | PATH 2 | PATH 5 | LINKS 1+2+4 | 12 |
| 9 | PATH 2 | PATH 6 | LINKS 1+2+4+5 | 10 |
| 10 | PATH 3 | PATH 4 | LINKS 1+2+3+5 | 9 |
| 11 | PATH 3 | PATH 5 | LINKS 1+2+4+5 | 10 |
| 12 | PATH 3 | PATH 6 | LINKS 1+2+5 | 8 |
| 13 | PATH 4 | PATH 5 | LINKS 2+3+4 | 11 |
| 14 | PATH 4 | PATH 6 | LINKS 2+3+5 | 9 |
| 15 | PATH 5 | PATH 6 | LINKS 2+4+5 | 10 |

FIG. 31B

| NO. | COMBINATION OF PATHS | | NUMBER OF OCCUPIED SLOTS | SOURCE NODE TRANSMISSION ANGLE DIFFERENCE | RELAY NODE RECEPTION ANGLE DIFFERENCE | RELAY NODE TRANSMISSION ANGLE DIFFERENCE | DESTINATION NODE RECEPTION ANGLE DIFFERENCE |
|---|---|---|---|---|---|---|---|
| 2 | PATH 1 | PATH 3 | 9 | 0 | 0 | 30 | 30 |
| 3 | PATH 1 | PATH 4 | 10 | 45 | 45 | 0 | 0 |
| 5 | PATH 1 | PATH 6 | 9 | 45 | 45 | 30 | 30 |
| 6 | PATH 2 | PATH 3 | 10 | 0 | 0 | 45 | 45 |
| 9 | PATH 2 | PATH 6 | 10 | 45 | 45 | 45 | 45 |
| 12 | PATH 3 | PATH 6 | 8 | 45 | 45 | 0 | 0 |
| 14 | PATH 4 | PATH 6 | 9 | 0 | 0 | 30 | 30 |
| 15 | PATH 5 | PATH 6 | 10 | 0 | 0 | 45 | 45 |

# WIRELESS COMMUNICATION PATH SELECTION METHOD AND SELECTION APPARATUS

BACKGROUND OF THE INVENTION

1. Field of the Invention

The present invention relates to a technique for selecting a plurality of wireless communication paths of data from a source node to a destination node.

2. Description of the Related Art

Conventionally, as a means for achieving stable data transmission between a plurality of nodes connected via wireless communication paths in which a communication state is readily changed, a method of transmitting identical data using a plurality of different communication paths is adopted.

In Japanese Patent Laid-Open No. 8-321799, a transmitting node, which has a plurality of antennas having different directions of directivities, transmits data to a receiving node by selecting a predetermined antenna via a first communication path, selects another antenna upon occurrence of a reception error to switch to a second communication path, and then transmits data.

However, in the conventional technique, a plurality of communication paths to be selected only have different directions of directivities, and how much communication paths are spatially approximate to each other is not taken into consideration. For this reason, when a plurality of communication paths to be used are spatially approximate to each other, if any obstacle appears on the way of the communication paths, the plurality of communication paths are likely to be concurrently interrupted. As a result, although the plurality of communication paths are used, data transmission reliability cannot often be improved.

In the conventional technique, since data is re-transmitted by switching the communication path at the time of occurrence of an error, a data transmission delay is not guaranteed. For this reason, when data cannot be received by re-transmission processing within a valid period, it imposes an influence on an application that requires realtimeness. For example, when temporally continuous stream data such as video data or audio data is transmitted, and the receiving side continuously plays it back, a lack of data occurs, thus posing a problem of disturbance of playback video data or interruption of playback audio data.

SUMMARY OF THE INVENTION

The present invention provides an apparatus and method for selecting a combination of wireless communication paths which suffer less transmission delay and are hardly interrupted upon transmitting data using a plurality of wireless communication paths having different directions of directivities.

According to one aspect of the present invention, there is provided a selection method of wireless communication paths in a node which selects wireless communication paths extending from a source node to a destination node, the method comprising: determining the amount of bandwidth occupied by wireless communication paths extending from the source node to the destination node; and selecting, based on spatial distances between wireless communication paths, a plurality of combinations of wireless communication paths from combinations of wireless communication paths in which the amount of bandwidth with respect to a combination of wireless communication paths is smaller than a predetermined threshold.

According to another aspect of the present invention, there is provided a selection apparatus for selecting wireless communication paths extending from a source node to a destination node, comprising: a determination unit that determines the amount of bandwidth occupied by wireless communication paths extending from the source node to the destination node; and a selection unit that selects, based on spatial distances between wireless communication paths, a plurality of combinations of wireless communication paths from combinations of wireless communication paths in which the amount of bandwidth with respect to a combination of wireless communication paths is smaller than a predetermined threshold.

Further features of the present invention will become apparent from the following description of exemplary embodiments (with reference to the attached drawings).

BRIEF DESCRIPTION OF THE DRAWINGS

FIGS. 6A and 6B are charts showing processing for deciding communication paths;

FIGS. 7A to 7D are flowcharts showing communication path selection processing;

FIG. 8 shows an example of a QoS (Quality of Service) table;

FIG. 9 is a table showing the relationship among QoS levels, modulation methods, and the numbers of occupied timeslots;

FIG. 10 is a table showing decision results of the modulation methods and the numbers of occupied timeslots;

FIG. 11 is a table showing correspondence between communication paths and communication links;

FIGS. 12A and 12B are tables showing combinations of communication paths to be excluded and angle differences;

FIG. 15 shows an example of a QoS table;

FIG. 16 is a table showing communication link candidates;

FIG. 17 is a table showing the numbers of occupied slots of communication paths;

FIG. 18 is a table showing combinations of communication paths;

FIG. 21 is a block diagram showing an example of the internal arrangement of a relay node;

FIG. 22 shows an example of QoS tables;

FIG. 23 is a table showing communication link candidates;

FIG. 24 is a table showing the numbers or occupied slots of communication paths;

FIG. 25A is a table showing combinations of communication paths to be excluded, and FIG. 25B is a table showing angle differences;

FIG. 28 shows an example of QoS tables;

FIG. 29 is a table showing communication link candidates;

FIG. 30 is a table showing the numbers of occupied slots of communication paths;

FIG. 31A is a table showing combinations of communication paths to be excluded, and FIG. 31B is a table showing angle differences.

DESCRIPTION OF THE EMBODIMENTS

Embodiments for carrying out the invention will be described in detail hereinafter with reference to the drawings.

[First Embodiment]

Figure 1:
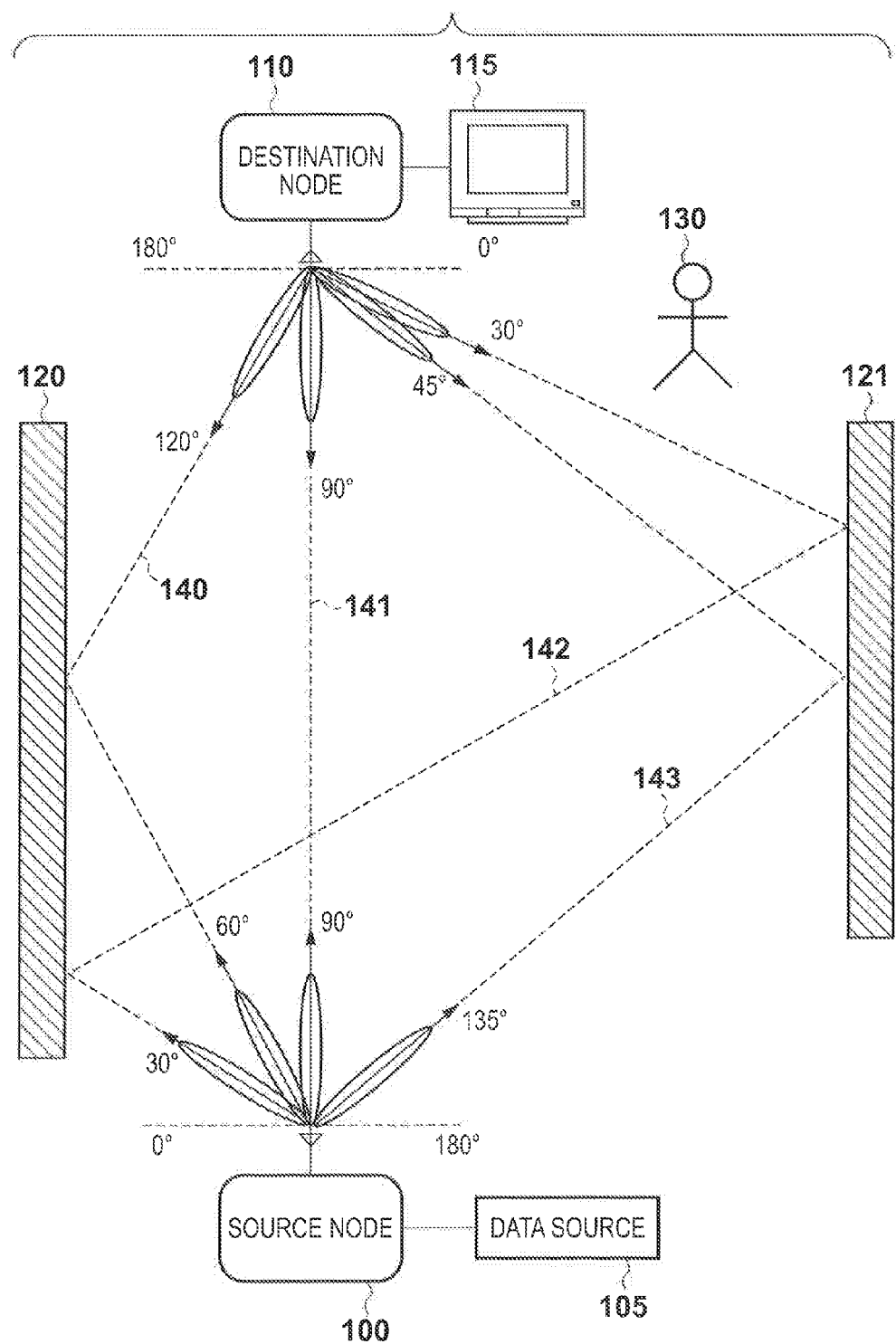
FIG. 1 is a view showing an example of a network configuration in a wireless communication system.

The configuration of a network, the arrangements of a plurality of wireless nodes, the configuration of a communication frame, and control operations will be described hereinafter with reference to FIG. 1 to FIGS. 13A and 13B. FIG. 1 shows an example of the network configuration in a wireless communication system. This system wirelessly transmits video data. A source node 100 wirelessly transmits video data acquired from a data source 105 to a destination node 110, which outputs the received video data to a display 115.

The source node and destination node respectively have directive antennas, and can wirelessly transmit and receive data while switching transmission/reception directive angles. FIG. 1 shows candidates of communication links 140 to 143 which can be used to transmit video data. In this case, the communication links 140 to 143 include the direct delivery communication link 141 and also the reflection communication links 140, 142, and 143 which use reflecting objects 120 and 121 such as walls. The communication links 140 to 143 have different transmission directive angles of the source node 100 and different reception directive angles of the destination node 110. The wireless communication system adopts an adaptive modulation method which allows each node to apply an optimal modulation method according to QoS levels of communication links so as to efficiently transmit data. For example, the direct delivery communication link 141 can use a modulation method with a high data rate since its transmission distance is short, and the reflection communication links 140, 142, and 143 can use a modulation method with a low data rate since their transmission distances are long.

In the first embodiment, the source node 100 selects two or more wireless communication paths (to be simply referred to as communication paths hereinafter) configured by the candidates of the plurality of communication links 140 to 143, so as to improve data transmission reliability, and transmits identical data using the two or more communication paths. Thus, even when any obstacle 130 appears on the way of communication paths, if an arbitrary one communication path allows data transmission, a communication can be continued without interrupting video playback.

Figure 2:
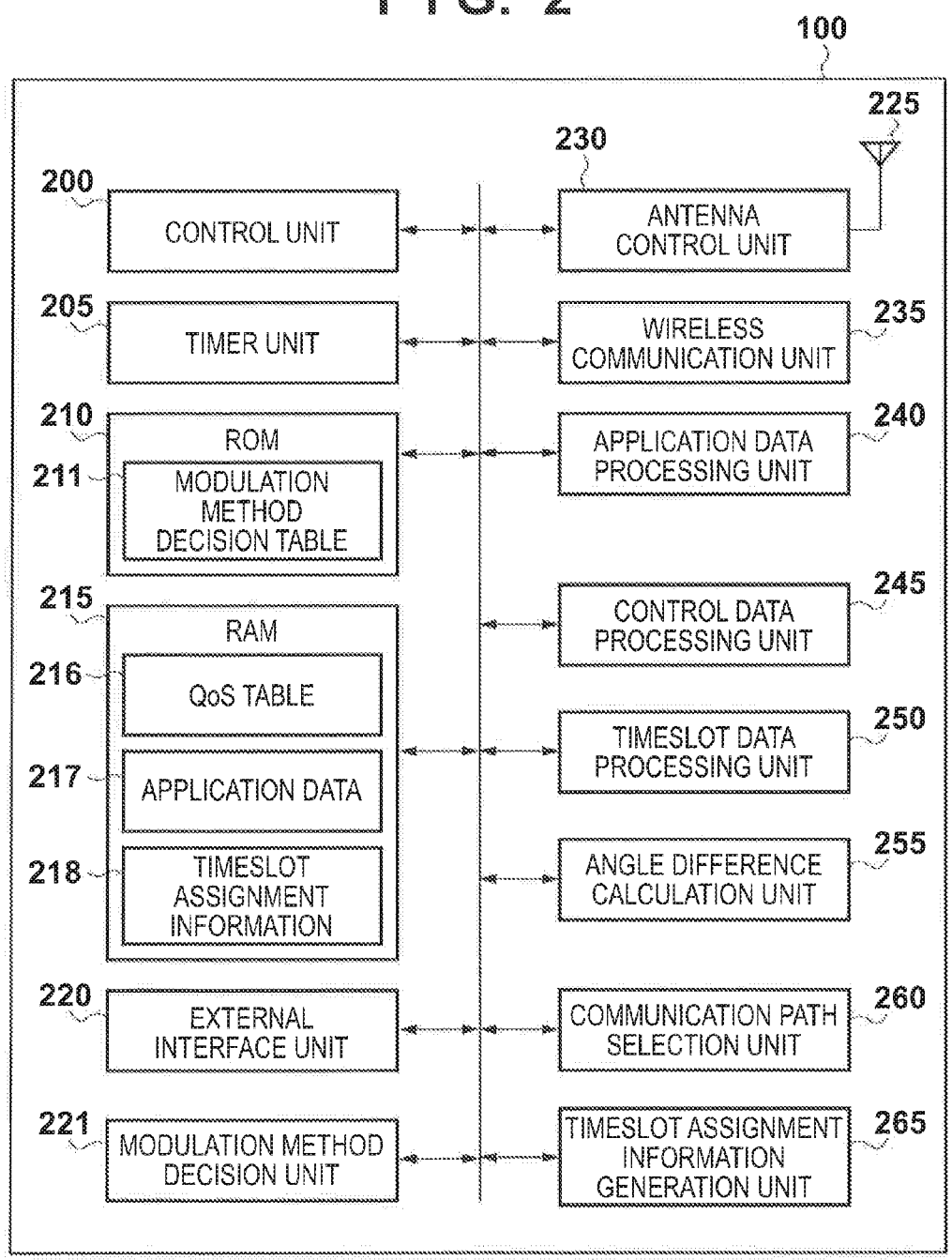
FIG. 2 is a block diagram showing an example of the internal arrangement of a source node.

The arrangements of the source node 100 and destination node 110 will be described below with reference to FIGS. 2 and 3. FIG. 2 is a block diagram showing an example of the internal arrangement of the source node 100. A control unit 200 shown in FIG. 2 controls the overall operations in the source node 100. A timer unit 205 generates transmission/reception processing timings. The transmission/reception processing timings are decided based on timeslot assignment information 218. A ROM 210 stores programs and nonvolatile parameters of the source node 100. A RAM 215 stores volatile parameters and data.

A modulation method decision table 211 defines applicable modulation methods according to QoS levels, and is saved in the ROM 210. A QoS table 216 indicates QoS levels of communication links at respective transmission/reception directive angles between the nodes in the network. Application data 217 includes video data received from the data source 105. In this case, the application data will be described as video data, but the present invention is not limited to this. For example, the application data may be audio data, simple file data, or the like. The timeslot assignment information 218 specifies timeslot assignments in a communication frame and modulation methods used in respective timeslots. Note that all of the QoS table 216, application data 217, and timeslot assignment information 218 are saved in the RAM 215.

An external interface unit 220 is an interface required to receive video data from the data source 105. A modulation method decision unit 221 decides modulation methods to be applied in respective communication links based on the QoS table 216 and modulation method decision table 211. An antenna control unit 230 controls a transmission/reception directive angle of an antenna 225 used to radiate wireless data. A wireless communication unit 235 executes transmission/reception signal processing of wireless data by predetermined modulation methods. An application data processing unit 240 packetizes the application data 217 as wireless data. A control data processing unit 245 processes control data of wireless protocols. Note that control data to be transmitted by the source node 100 includes a start instruction of training processing for measuring QoS levels, a training sequence for measuring QoS levels, timeslot assignment information, and the like. Also, control data to be transmitted by another node includes a training sequence for measuring QoS levels and control information such as QoS information.

A timeslot data processing unit 250 controls the wireless communication unit 235 based on timings and the modulation methods specified in the timeslot assignment information 218 so as to transmit timeslot data and to receive those from another node. The timeslot data include video data, control data generated by each node, and the like. An angle difference calculation unit 255 acquires, by calculations, angle differences of transmission/reception directive angles between wireless communication paths (to be simply referred to as communication paths hereinafter) from the source node 100 to the destination node 110. A communication path selection unit 260 selects a plurality of communication paths from the source node 100 to the destination node 110 based on the angle differences calculated by the angle difference calculation unit 255. A timeslot assignment information generation unit 265 decides timeslot assignments and modulation methods according to the selected communication paths, thus deciding the timeslot assignment information 218. The timeslot assignment information generation unit 265 also serves as a determination unit which determines communication bands (the number of timeslots) occupied by the respective wireless communication paths based on the modulation methods to be applied in the respective communication links decided by the modulation method decision unit 220 and the relationship between the modulation methods and the numbers of occupied slots shown in FIG. 9.

Figure 3:
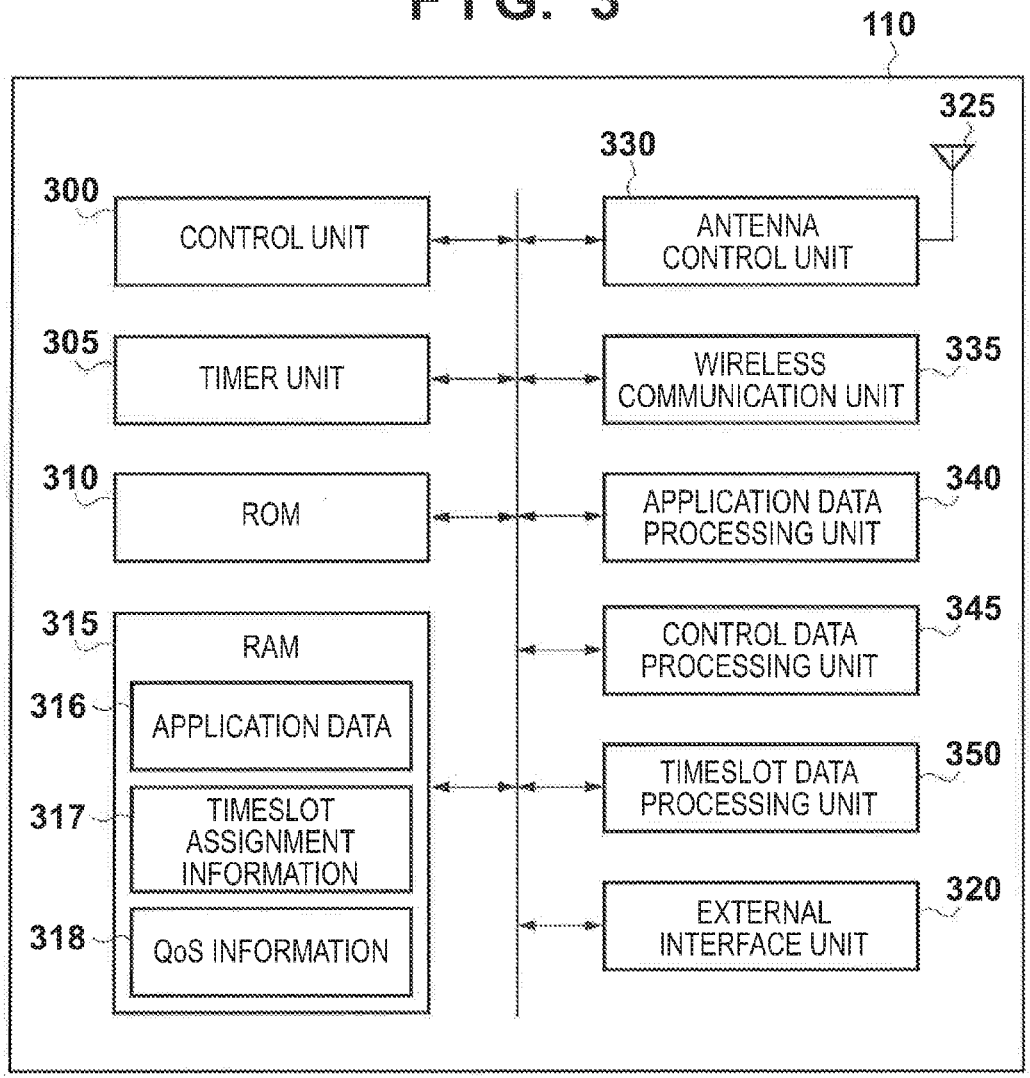
FIG. 3 is a block diagram showing an example of the internal arrangement of a destination node.

FIG. 3 is a block diagram showing an example of the internal arrangement of the destination node 110. A control unit 300 controls the overall operations in the destination node 110. A timer unit 305 generates transmission/reception processing timings. The transmission/reception processing timings are decided based on timeslot assignment information 317 received via a wireless communication. A ROM 310 stores programs and nonvolatile parameters of the destination node 110. A RAM 315 stores volatile parameters and data.

Application data 316 includes video data received via a wireless communication. The timeslot assignment information 317 specifies timeslot assignments in a communication frame, and modulation methods used in respective timeslots. QoS information 318 indicates communication states at respective transmission/reception directive angles with another node. Note that all of the application data 316, timeslot assignment information 317, and QoS information 318 are saved in the RAM 315.

An external interface unit 320 has a function of outputting video data to the display 115. An antenna control unit 330 controls transmission/reception directive angles of an antenna 325 used to radiate wireless data. A wireless communication unit 335 executes transmission/reception signal processing of wireless data by predetermined modulation methods. An application data processing unit 340 extracts data addressed to the self node of the application data 316, and outputs the extracted data to the external interface unit 320. A control data processing unit 345 processes control data of wireless protocols. The control data to be transmitted by the source node 100 includes a start instruction of training processing for measuring QoS levels, a training sequence for measuring QoS levels, timeslot assignment information, and the like. Also, control data to be transmitted by the destination node 110 includes control information such as QoS information.

A timeslot data processing unit 350 controls the wireless communication unit 335 using timings and modulation methods specified in the timeslot assignment information 317 to transmit timeslot data and to receive those from another node. The timeslot data include video data, control data generated by each node, and the like.

Figure 4:
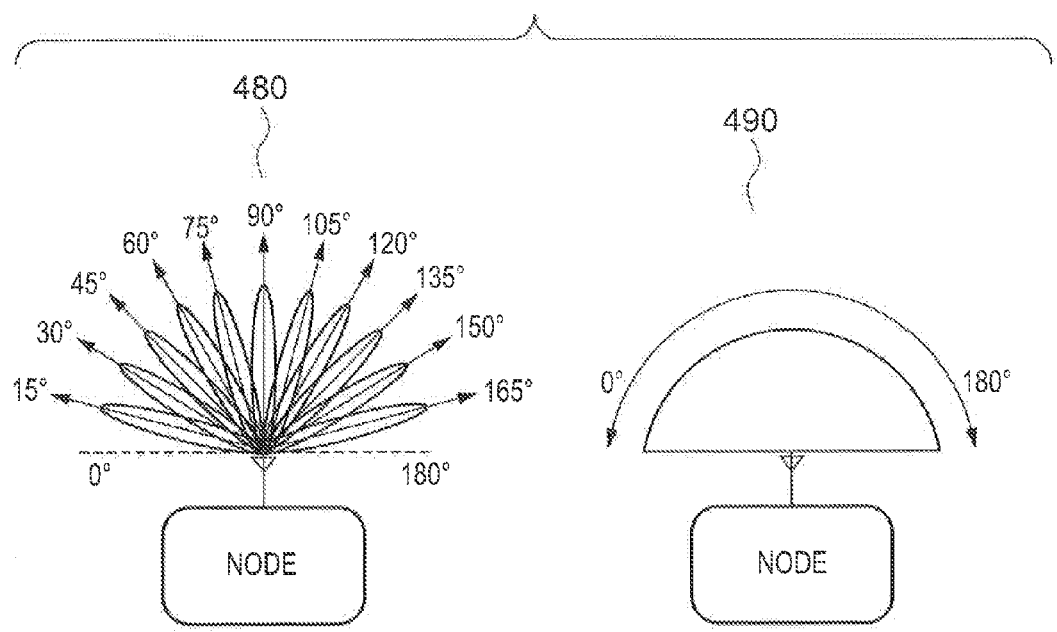
FIG. 4 is a view for explaining antenna control of a node.

FIG. 4 is a view for explaining antenna control of a node. Each node includes a directive antenna configured by a plurality of antenna elements. By controlling phases of wireless signals transmitted from/received by the respective antenna elements, a narrow directivity mode 480 and wide directivity (wide) mode 490 can be switched. As shown in FIG. 4, in the narrow directivity mode 480, a range from 15° to 165° is controlled at a resolution of 15° steps, thereby forming beams of 11 directive angle patterns. The directive angle range and resolution in the narrow directivity mode 480 are not limited to them.

In the wide mode 490, a wide directive angle range from 0° to 180° is covered. However, the directive angle range is not limited to this. In the narrow directivity mode 480, although a transmission/reception range of communication paths is limited, since a high gain can be obtained, high-rate data transmission can be made. In the wide mode 490, a transmission/reception range of communication paths is not limited compared to the narrow directivity mode 480, but this mode is characterized by a low rate. In this example, assume that application data with a large data size is transmitted/received in the narrow directivity mode 480, and control data with a small data size is transmitted/received in the wide mode 490.

Figure 5A:
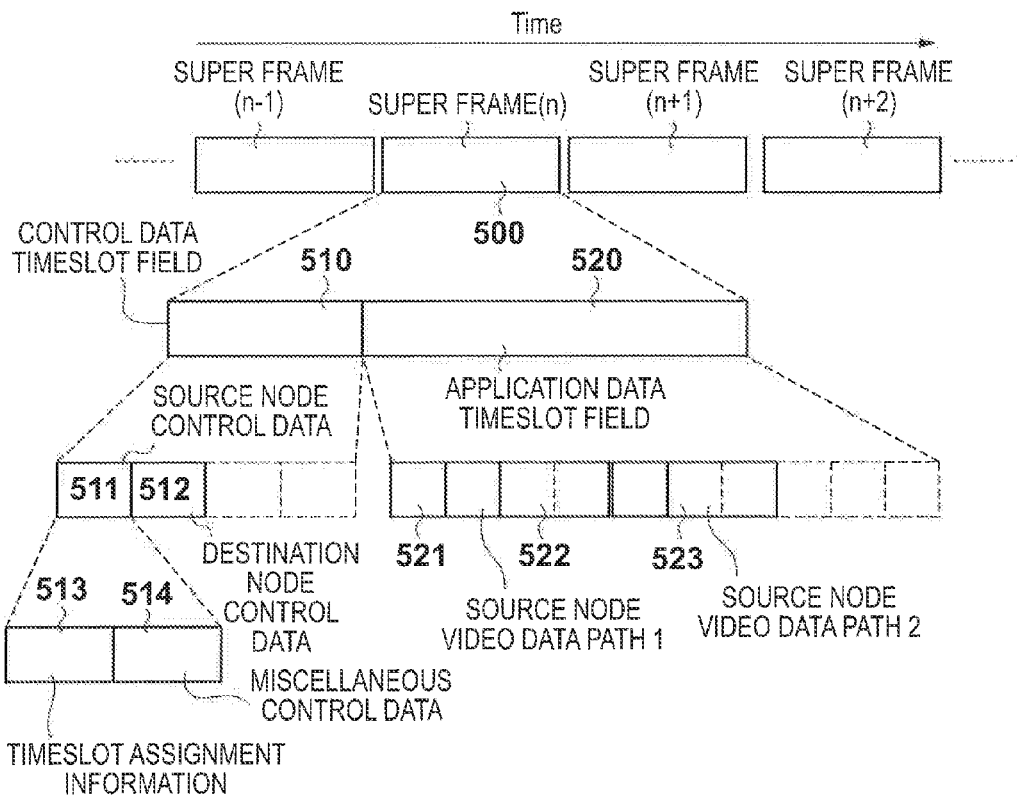
FIGS. 5A and 5B are views showing configuration examples of a communication frame.
Figure 5B:
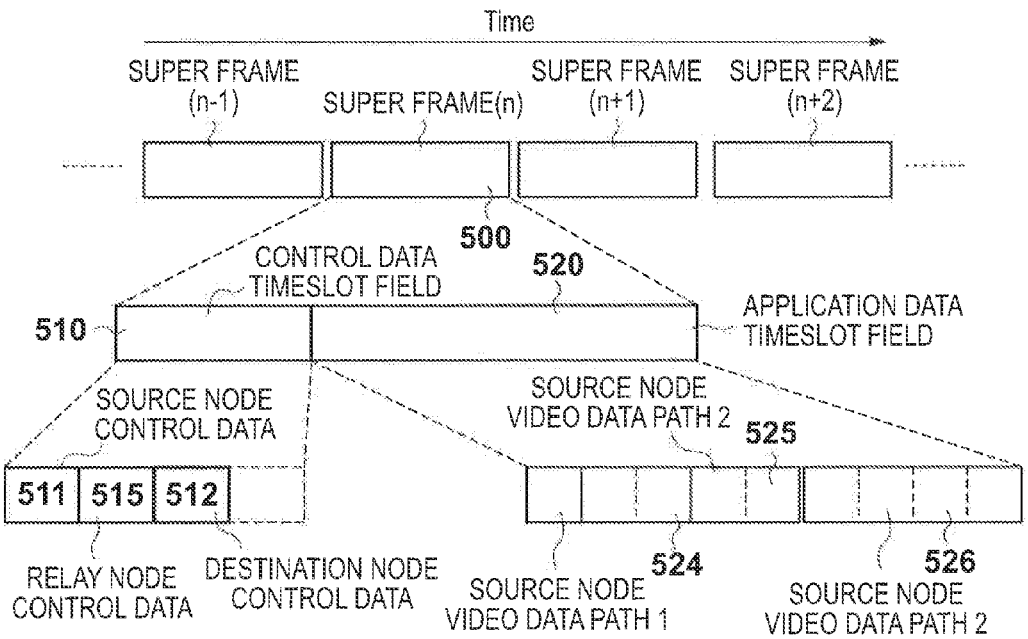

The configuration of a communication frame will be described below with reference to FIGS. 5A and 5B. FIG. 5A shows an example of the configuration of a superframe 500 as a communication frame in the wireless communication system. The superframe 500 has a fixed length, and is transmitted at repetitive cycles as a valid period of application data. The superframe 500 includes two types of time-divisional field, that is, a control data timeslot field 510 and application data timeslot field 520.

In the control data timeslot field 510, timeslots are assigned to all nodes which join the network, so as to allow all the nodes to exchange control information. Control data 511 included in a timeslot assigned to the source node 100 includes timeslot assignment information 513 and miscellaneous control data 514 such as a start instruction of training processing and a training sequence. Control data 512 included in a timeslot assigned to the destination node 110 includes QoS information and the like.

In the application data timeslot field 520, a timeslot 521 is assigned to a node which transmits video data. In the example shown in FIG. 5A, the source node 100 transmits identical video data 522 and 523 to the destination node 110 using two communication paths. Each communication link can adopt a modulation method decided by the source node according to a QoS state, and the number of required timeslots is different depending on the modulation methods to be used. In this example, the first communication path occupies four timeslots, and the second communication path occupies three timeslots.

All of the timeslot configurations of the control data and application data and modulation methods to be applied in respective timeslots in the communication frame are stored in the timeslot assignment information generated by the source node 100. However, since control data timeslots include data which are transmitted in the wide mode and are addressed to a plurality of nodes unlike the application data, a modulation method for these timeslots may be fixed.

Figure 6A:
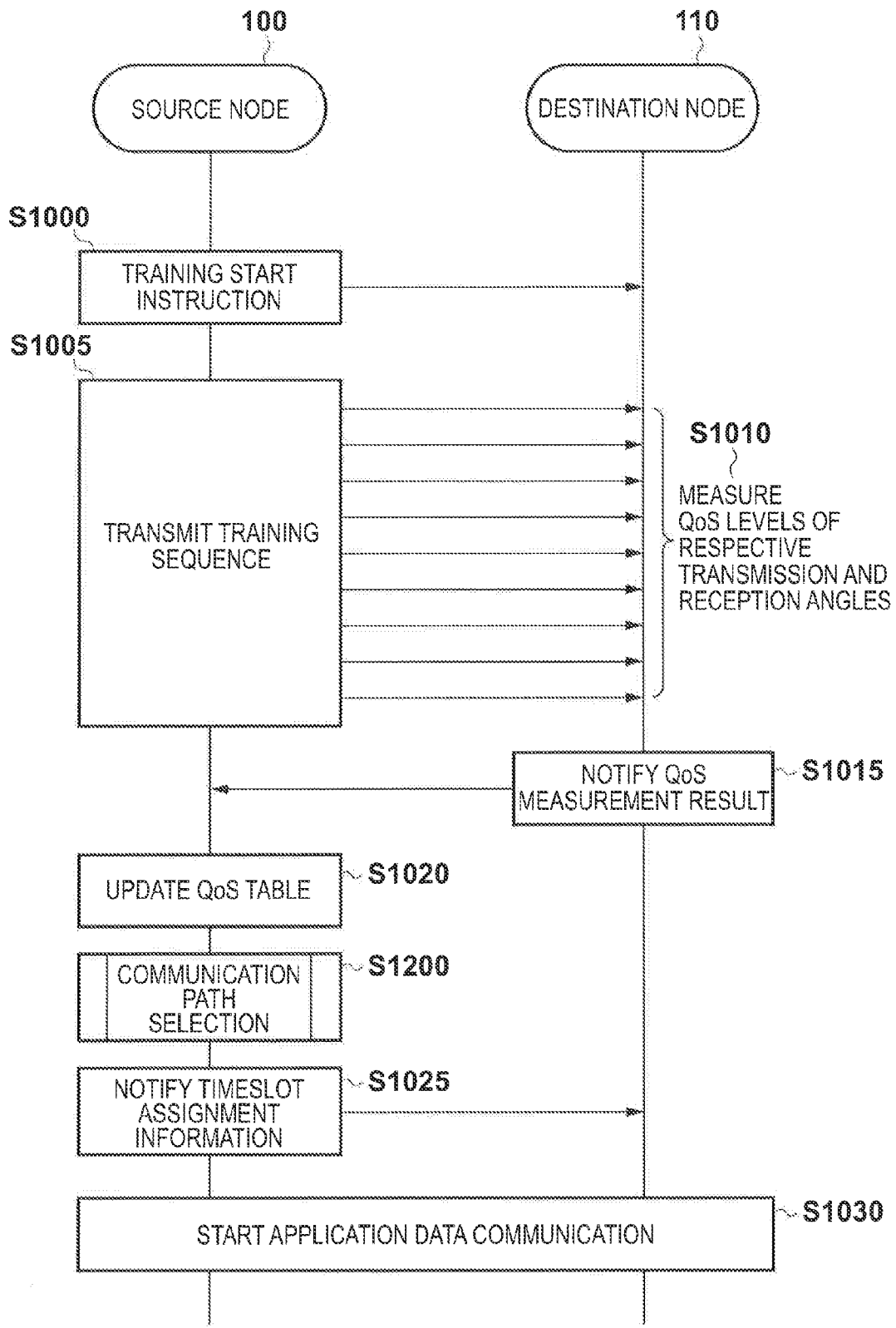

Processing for executing training processing for measuring QoS levels between the nodes prior to transmission of application data, and deciding communication paths to be used based on the QoS levels collected by the source node 100 will be described below with reference to FIG. 6A.

In step S1000, the source node 100 transmits control data indicating a training start instruction to the destination node 110. The control data indicating the training start instruction includes information of a transmitting node of a training sequence, and information of a training sequence transmission start time and switching timings of transmission directive angles. In this case, the source node 100 is set as the transmitting node of the training sequence. After that, the source node 100 transmits a training sequence as a given signal for a predetermined period while switching transmission directive angles of the antenna at predetermined timings in step S1005.

On the other hand, the destination node 110, which received the training start instruction, receives the training signal and measures QoS levels while switching the reception directive angles of the antenna at predetermined timings in step S1010. The destination node 110 can detect the transmission directive angles of the training sequence received from the source node 100 from information of the training sequence transmission start time and switching timings of transmission directive angles. With this processing, the destination node 110 can measure QoS levels in combinations of the respective transmission directive angles of the source node 100 and the respective reception directive angles of itself. Upon completion of measurements of all QoS levels, the destination node 110 transmits the measurement results of the QoS levels to the source node 100 in step S1015.

In step S1020, the source node 100 saves the received measurement results of the QoS levels in the QoS table to update that table. In step S1200, the source node 100 selects a plurality of communication paths used in transmission of application data based on the QoS table. Details of a communication path selection algorithm will be described later. The source node 100 decides timeslot assignments and modulation methods to be applied in respective communication links according to the selected communication paths, and notifies the destination node 110 of timeslot assignment information. After that, the source node 100 and destination node 110 start transmission of application data based on the timeslot assignment information.

Figure 7A:
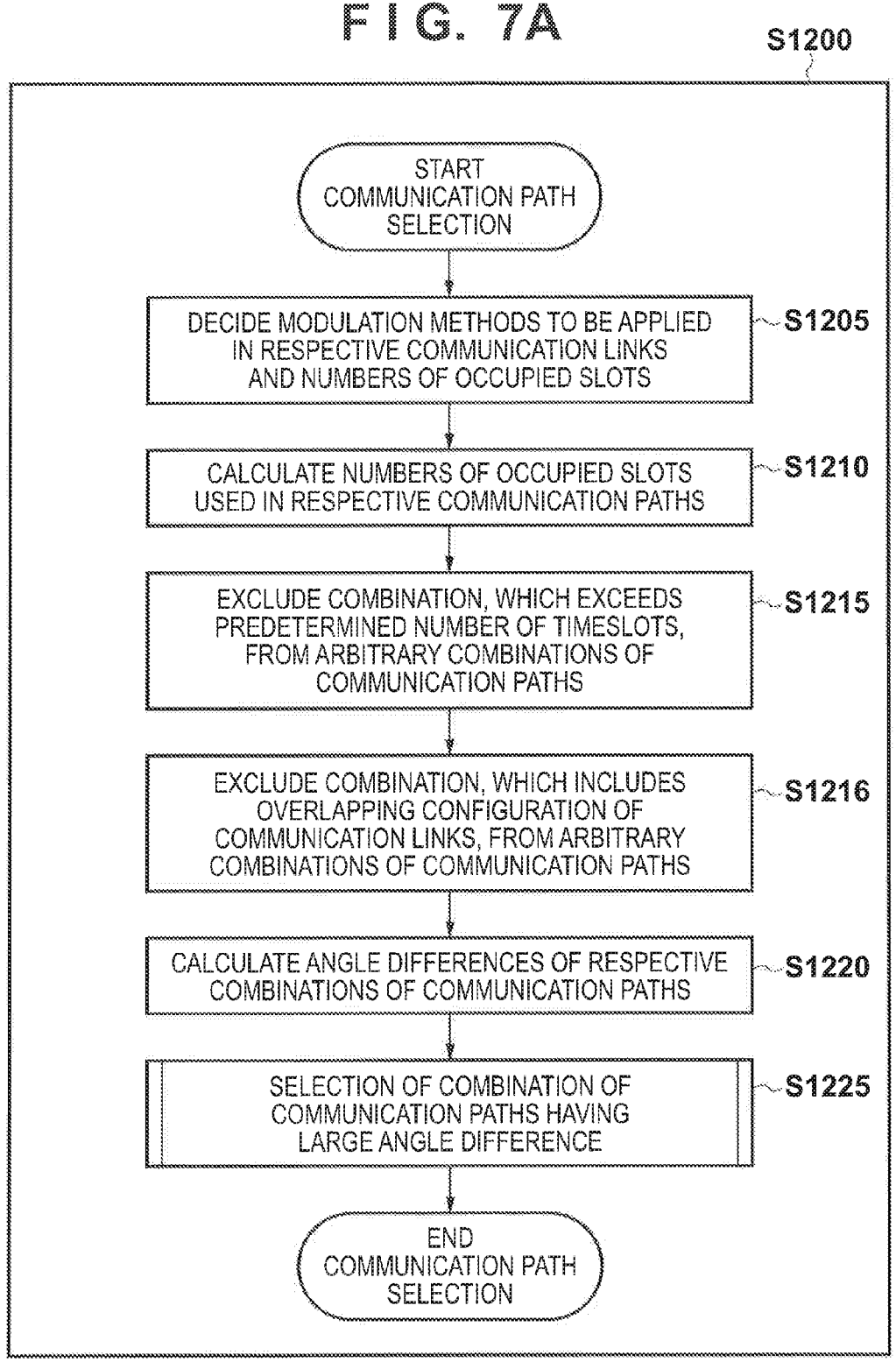
Figure 7D:
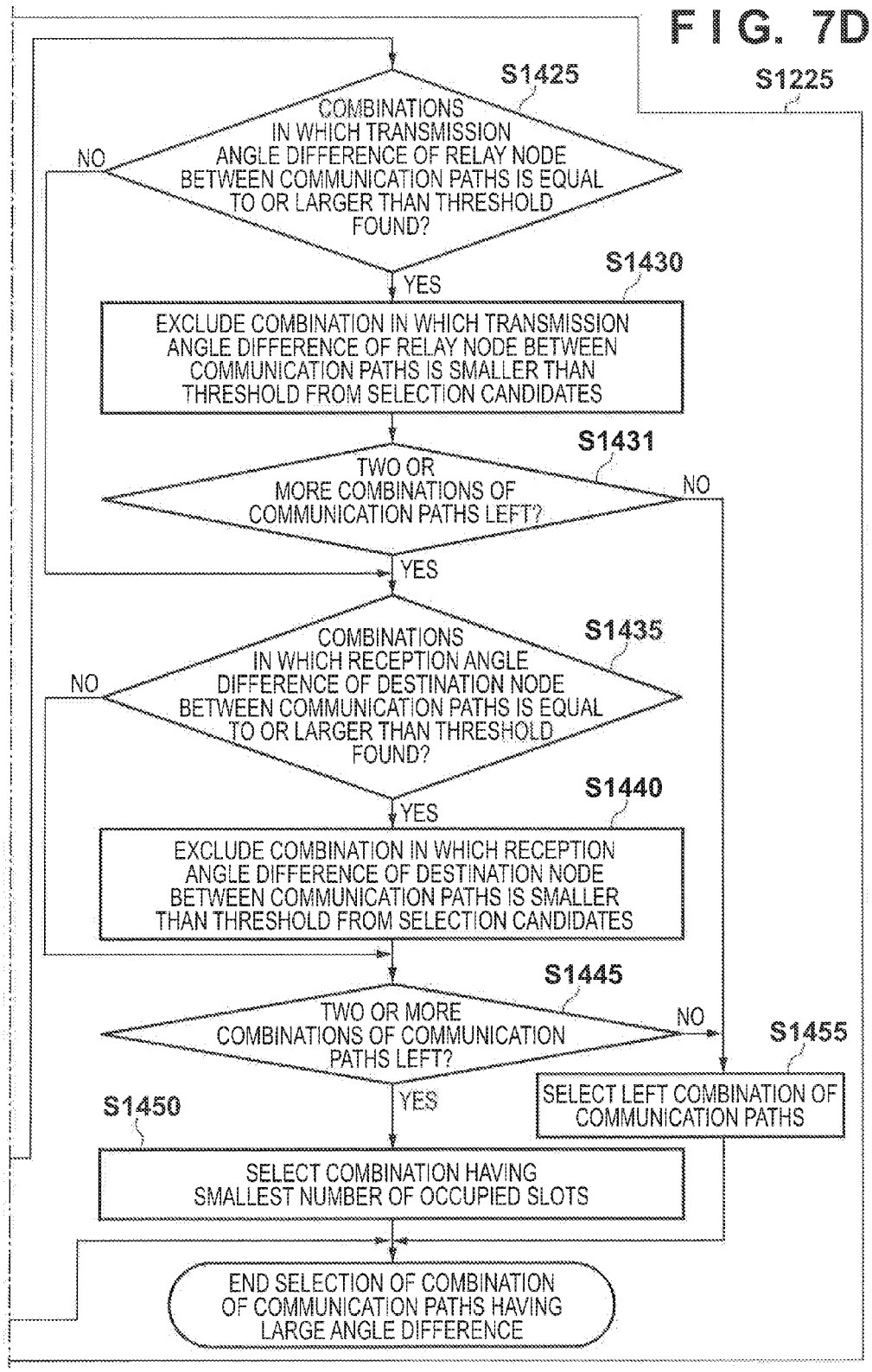

The communication path selection algorithm of the source node 100 will be described below with reference to FIG. 7A. In this case, assume that the network configuration shown in FIG. 1 and the QoS table shown in FIG. 8 are used. Also, assume that the number of communication paths selected by the source node 100 is 2, and the number of timeslots in the application data timeslot field is 8.

In step S1205, modulation methods to be applied in respective communication links and the numbers of timeslots to be occupied are decided based on the QoS table. FIG. 8 shows an example of the QoS table of the network configuration example shown in FIG. 1. Respective cells indicate QoS levels in combinations of predetermined transmission directive angles of the source node 100 and predetermined reception directive angles of the destination node 110. The levels include 10 levels from level 1 to level 10, and assume larger values as QoS is better. A cell that describes "NA (Not Applicable)" indicates that QoS is too bad to establish communication. For example, a QoS level or a communication link when the source node 100 transmits at a directive angle of 60° and the destination node 110 receives at a directive angle of 120° is level 7. The source node 100 uniquely decides modulation methods applicable to these communication links with reference to a modulation method decision table shown in FIG. 9. This table defines modulation methods to be applied while classifying the methods into four, that is, BPSK, QPSK, 8PSK, and 16QAM in correspondence with QoS levels.

A QoS level of a communication link when the source node 100 transmits at a directive angle of 90° and the destination node 110 receives at a directive angle of 90° is level 9. Hence, the 16QAM modulation method can be used for this communication link. Since respective modulation methods have different data rates, they occupy different numbers of timeslots upon transmission of identical video data, as shown in FIG. 9. Decision results of the modulation methods to be applied in respective communication links and the numbers of timeslots to be occupied are as shown in a table shown in FIG. 10, and four communication links are selected as candidates.

In step S1210, the numbers of occupied slots of communication paths from the source node 100 to the destination node 110 are checked based on the information of the communication links decided in step S1205. In this example, since the communication links from the source node 100 directly reach the destination node 110, communication paths and communication links have one-to-one correspondences, as shown in FIG. 11. From these communication paths, combinations of two communication paths are selected.

In step S1215, the number of occupied slots in an arbitrary combination of two communication paths shown in FIG. 11 is checked. In this case, since the number of timeslots in the application data timeslot field is 8, as described above, a combination of communication paths, which occupy nine or more timeslots, is excluded from selection candidates. FIG. 12A is a table showing combinations of communication paths left as candidates, and indicates that hatched combinations of communication paths are excluded.

In step S1216, if combinations of communication paths in FIG. 12A include that of communication paths including overlapping communication links used, that combination is excluded. This processing is to avoid overlapping of communication path candidates when the network includes a relay node, and combinations of communication paths include the relay node, as in the fourth embodiment to be described later. In the example to be described in this case, there is no combination of overlapping communication paths, and this processing is skipped.

In step S1220, for each of the combinations of communication paths, which are left as candidates, angle differences of transmission and reception directive angles used in these communication paths are calculated. As a result, the angle differences are calculated for all the combinations of communication paths as in a table shown in FIG. 12B.

In step S1225, of the combinations of communication paths shown in FIG. 12B, a combination of communication paths having large angle differences is selected. Details of this processing will be described below with reference to the flowchart shown in FIG. 7B. Assume that an angle difference threshold used in checking processes in steps S1300 and S1310 is 60°.

It is checked in step S1300 if there are combinations in each of which an angle difference of transmission directive angles of the source node 100 between communication paths is equal to or larger than the threshold. In case of FIG. 12B, since the angle differences of the transmission directive angles in combinations No.2 (communication paths 1 and 3) and No. 5 (communication paths 2 and 4) are equal to or larger than 60°, the process advances to step S1305. If there is no combination whose angle difference is equal to or larger than the threshold, the process jumps to step S1310. In step S1305, combinations of communication paths having the angle differences of the transmission directive angles, which are smaller than 60°, are excluded from selection candidates. As a result, the combinations No.2 (communication paths 1 and 3) and No. 5 (communication paths 2 and 4) are left as selection candidates.

It is checked in step S1306 whether or not two or more combinations of communication paths are left as selection candidates. If only one combination is left, the process jumps to step S1330. In this example, since the two combinations No. 2 (communication paths 1 and 3) and No.5 (communication paths 2 and 4) are left as selection candidates, the process advances to step S1310. It is checked in step S1310 whether or not there are combinations in each of which an angle difference of reception directive angles of the destination node 110 between communication paths is equal to or larger than the threshold. Since the angle difference of the reception directive angles in both the combinations No.2 (communication paths 1 and 3) and No.5 (communication paths 2 and 4) are equal to or larger than 60°, the process advances to step S1315. If there is no combination whose angle difference is equal to or larger than the threshold, the process jumps to step S1320.

In step S1315, a combination of communication paths whose angle difference of the reception directive angles is smaller than 60° is excluded from selection candidates. As a result, the combinations No. 2 (communication paths 1 and 3) and No. 5 (communication paths 2 and 4) are left as selection candidates. Next, it is checked in step S1320 whether or not two or more combinations of communication paths are left as selection candidates. If only one combination is left, the process advances to step S1330 to select that combination of communication paths. In this example, since two selection candidates of communication paths are left, the process advances to step S1325.

Finally, in step S1325, a combination having the smallest number of occupied slots of the left combinations of communication paths is selected. The combination No. 2 (communication paths 1 and 3 ) has the number of occupied slots=8, and the combination No.5 (communication paths 2 and 4) has the number of occupied slots=7, the combination No.5 (communication paths 2 and 4) is finally selected. Then, effects of shortening a transmission time of the source node 100 and reducing power consumption can be obtained. On the other hand, when communication paths intersect with each other as in the combination No.2 (communication paths 1 and 3), communications are likely to be readily interrupted although the angle differences are large.

As described above, when a communication path which reaches the destination node after it is reflected a plurality of times on walls is included, since the number of occupied slots of that path is large, a combination which occupies fewer communication bands (in the above description, a combination having the smaller number of occupied slots) is preferentially selected from those having the large angle differences. Thus, a possibility of selection of communication paths which are readily interrupted although the angle differences are large can be reduced.

Note that the number of occupied slots is used as a criterion used to select a combination from a plurality of candidates in step S1325. However, the present invention is not limited to this, and priority levels may be given based on other kinds of characteristic information of communication paths. For example, as one method, totals of transmission powers of the source node 100 upon transmission of data using respective communication paths may be calculated, and a combination of communication paths having a smaller total of transmission powers in the communication paths may be preferentially selected from those of communication paths having the number of occupied communication bands which is smaller than a predetermined threshold. As a result, an effect of reducing power consumption of the source node 100 can be obtained. As another method, a combination of communication paths having a larger total of QoS levels of the destination node 110 in the communication paths may be preferentially selected from those of communication paths having the number of occupied communication bands which is smaller than a predetermined threshold. As a result, an effect of eliminating communication errors can be obtained. As still another method, communication paths may be selected in turn from those having larger angle differences of the transmission directive angles and larger angle differences of the reception directive angles. As a result, communication paths which are spatially separated by a larger distance can be selected, and a possibility of concurrently interrupting a plurality of communication paths by an obstacle can be reduced.

Figure 13A:
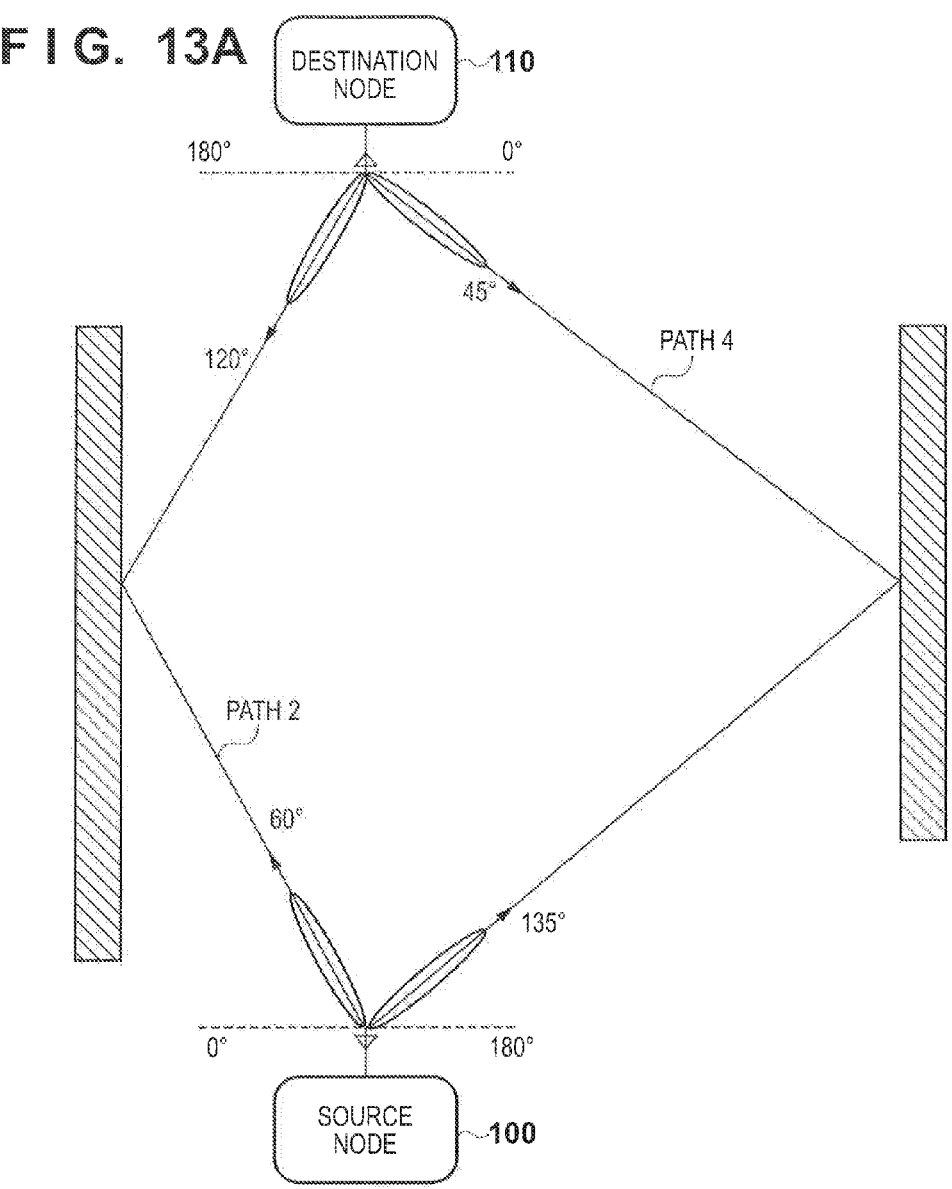
FIG. 13A shows finally selected communication paths.
Figure 13B:
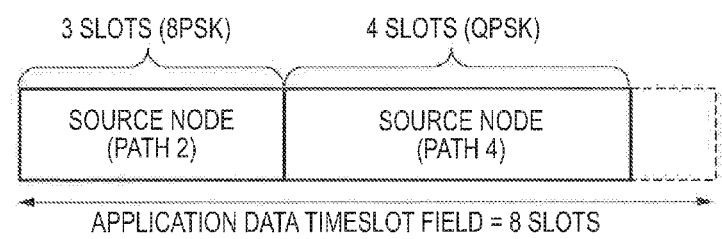
FIG. 13B shows timeslot assignments.

FIG. 13A shows the finally selected communication paths. FIG. 13B shows timeslot assignments in the application data timeslot field.

By applying the aforementioned algorithm, spatially separated communication paths can be selected in consideration of a data valid period, a delay time is guaranteed, and highly reliable data transmission is attained.

[Second Embodiment]

Figure 14:
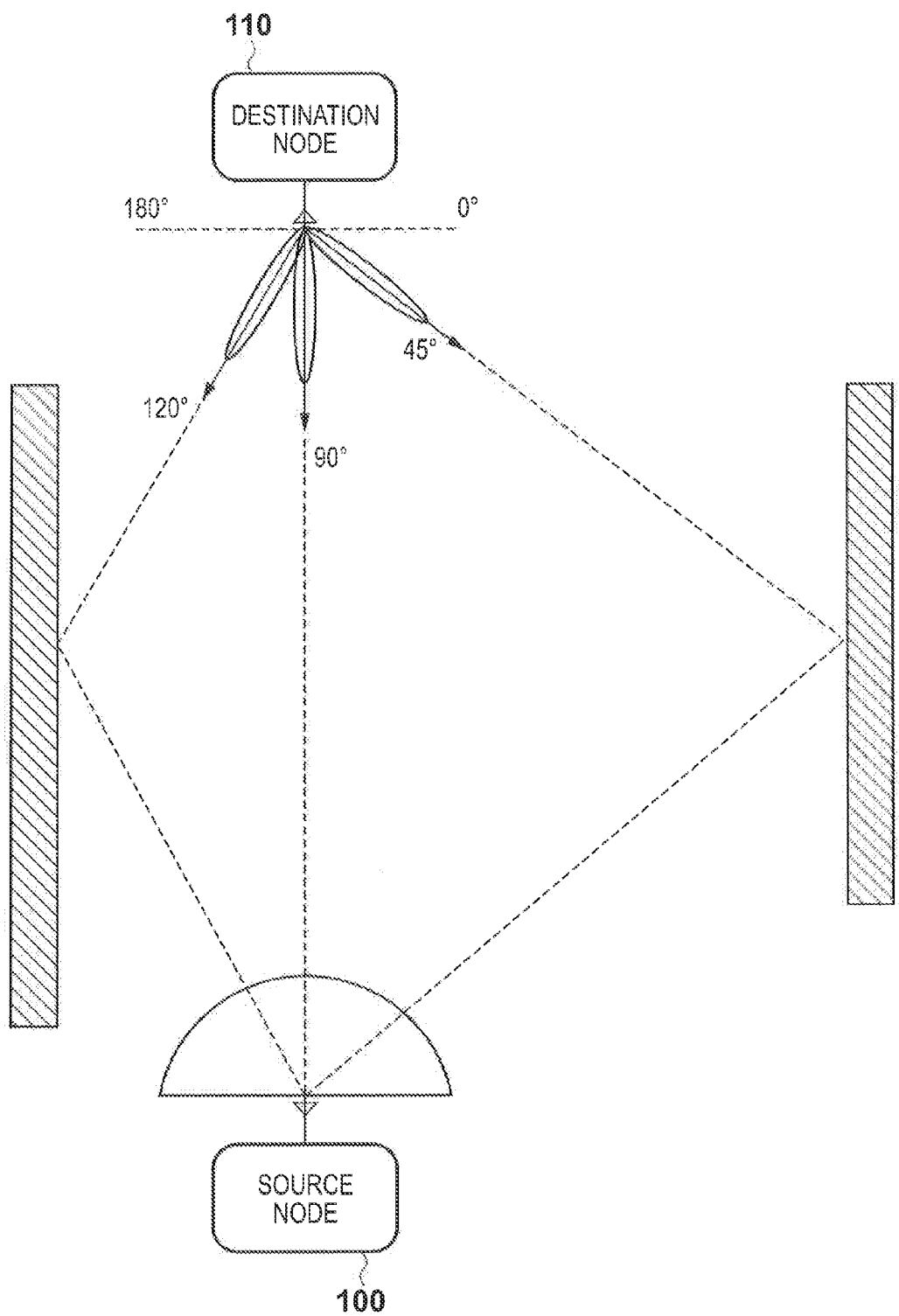
FIG. 14 is a view showing an example of a network configuration according to the second embodiment.

The second embodiment will explain a case in which the source node 100 does not have the narrow directivity mode but has only the wide mode, and the destination node 110 has the narrow directivity mode, as shown in the network configuration view of FIG. 14. A control operation upon selection of communication paths will be described below according to the algorithm shown in FIG. 7A. Assume that the number of communication paths selected by the source node 100 is 2, and the number of timeslots in the application data timeslot field is 8. Also, a table shown in FIG. 15 is used as the QoS table.

In step S1205, modulation methods to be applied in respective communication links and the numbers of timeslots to be occupied are decided based on the QoS table shown in FIG. 15 and the modulation method decision table shown in FIG. 9. As a transmission angle of the source node 100, only "wide" is available. As a result, as shown in a table shown in FIG. 16, three communication links are left as candidates.

In step S1210, a table indicating the numbers of occupied slots of wireless communication paths (communication paths), as shown in FIG. 17, is generated from the table of the communication links shown in FIG. 16. From these communication paths, combinations of two communication paths are selected. In step S1215, the number of occupied slots in an arbitrary combination of two communication paths of those shown in FIG. 17 is checked. As described above, since the number of timeslots in the application data timeslot field is 8, a combination of communication paths which occupy nine or more timeslots is excluded from selection candidates. In this case, since there is no combination which occupies nine or more timeslots of all the combinations of communication paths, there is no combination to be excluded. As a result, combinations of communication paths shown in a table of FIG. 18 are selected as candidates.

In step S1216, if combinations of communication paths shown in FIG. 18 include that of communication paths including overlapping communication links used, that combination is excluded. In this example, since there is no combination of overlapping communication paths, no combination is excluded. In step S1220, for each of combinations of communication paths left as candidates, angle differences of transmission directive angles and reception directive angles used between the communication paths are calculated. Since only "wide" is available as the transmission angle of the source node 100, all the angle differences of the transmission directive angles are zero. As a result, angle differences are calculated for all the combinations of communication paths, as shown in the table of FIG. 18.

In step S1225, a combination of communication paths having large angle differences is selected from those of communication paths shown in FIG. 18. In this case, since only "wide" is available as the transmission directive angle of the source node 100, a combination of communication paths is selected based only on the angle differences of the reception directive angles of the destination node 110. Details of this processing will be described below with reference to the flowchart shown in FIG. 7B. Assume that in this case, an angle difference threshold used in checking processes in steps S1300 and S1310 is 45°.

It is checked in step S1300 if there are combinations in each of which an angle difference of transmission directive angles of the source node 100 between communication paths is equal to or larger than the threshold. Since only "wide" is available as the transmission directive angle of the source node 100, all the angle differences of the transmission directive angles are zero, and the process jumps to step S1310. In steps S1310 to S1315, a combination in which the angle difference of the reception directive angles of the destination node 110 between the communication paths is smaller than the threshold is excluded. As a result, combinations No.1 (communication paths 1 and 2) and No.2 (communication paths 1 and 3 ) in FIG. 18 are left as selection candidates.

Next, it is checked in step S1320 whether or not two or more combinations of communication paths are left as selection candidates. In this example, since there are two selection candidates of communication paths, the process advances to step S1325. Finally, in step S1325, the combination No. 1 (communication paths 1 and 2) as a combination having the smallest number of occupied slots of the left combinations of communication paths is selected. Note that the number of occupied slots is used as a criterion used to select a combination from a plurality of candidates in step S1325. However, the present invention is not limited to this, and priority levels may be given based on other kinds of characteristic information of the communication paths. For example, as one method, a combination of communication paths having a larger total of QoS levels of the destination node 110 in the communication paths may be preferentially selected from those of communication paths having the number of occupied communication bands which is smaller than a predetermined threshold. As a result, an effect of eliminating communication errors can be obtained. As another method, communication paths may be selected in turn from those having larger angle differences of the transmission directive angles and larger angle differences of the reception directive angles. As a result, communication paths which are spatially separated by a larger distance can be selected, and a possibility of concurrently interrupting a plurality of communication paths by an obstacle can be reduced.

Figure 19A:
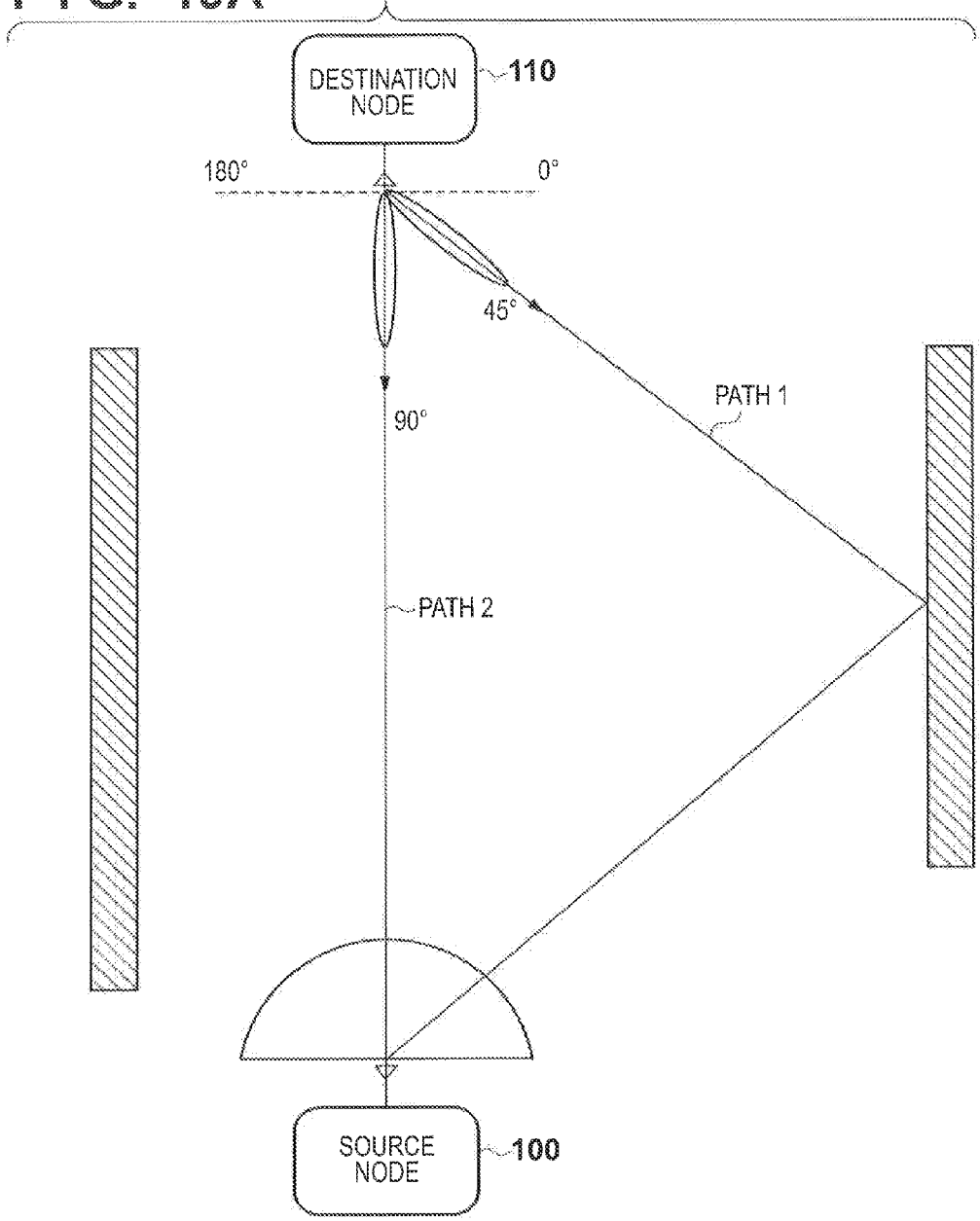
FIG. 19A shows finally selected communication paths.
Figure 19B:
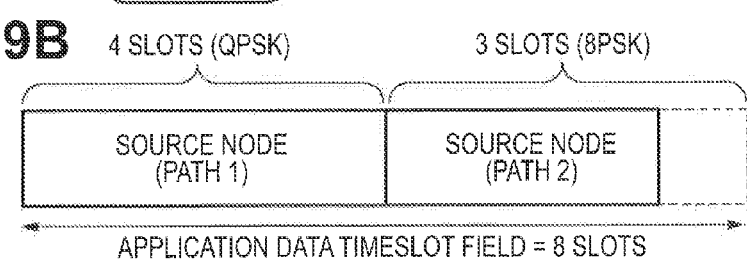
FIG. 19B shows timeslot assignments.

FIG. 19A shows the finally selected communication paths. FIG. 19B shows timeslot assignments in the application data timeslot field.

The second embodiment has explained the case in which the source node 100 has only the wide mode, and the destination node 110 has the narrow directivity mode. The same applies to a case in which the source node 100 has only the narrow directivity mode, and the destination node 110 has the wide mode. In this case, communication paths are selected based on the angle differences of the transmission directive angles of the source node 100 regardless of the reception directive angles of the destination node 110.

As described above, when at least one node which configures the communication network has the narrow directivity mode, a combination of communication paths can be selected by applying the same algorithm.

[Third Embodiment]

Figure 20:
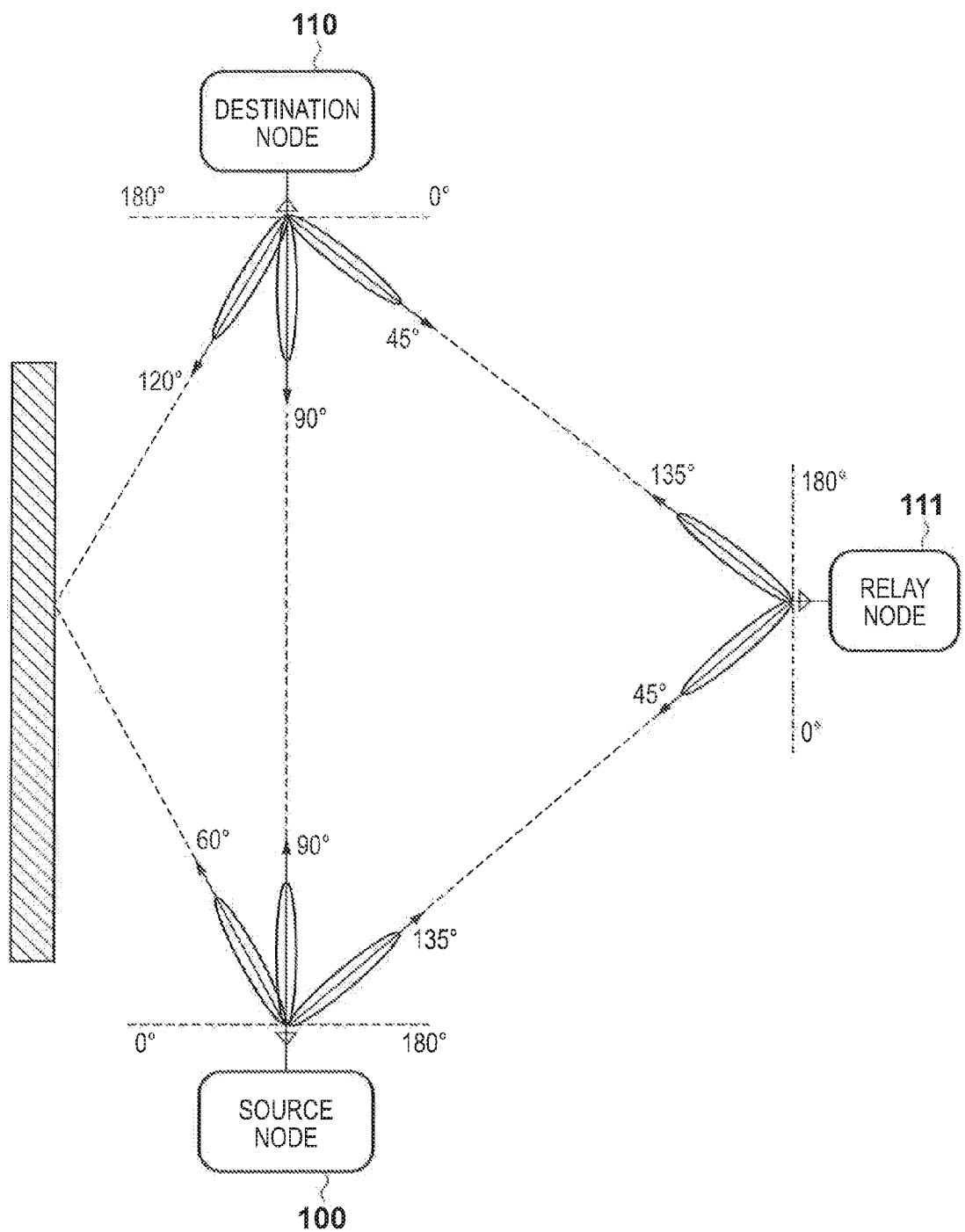
FIG. 20 is a view showing an example of a network configuration according to the third embodiment.

The third embodiment will explain a case in which a relay node 111 which relays video data received from the source node 100 is included, as shown in the network configuration view of FIG. 20. The internal arrangement of the relay node 111 will be described first with reference to FIG. 21. Since the internal arrangement of this relay node 111 is nearly the same as that of the destination node 110, only differences from the destination node 110 will be explained.

The relay node 111 does not include any external interface unit, which is included in the destination node 110. An application data processing unit 440 saves data received from the source node in a RAM 415 so as to relay that data, and relays the data using timeslots assigned to the self node.

The configuration of the superframe 500 when the relay node 111 is added will be described below with reference to FIG. 5B. Unlike in the superframe configuration shown in FIG. 5A, a timeslot for the relay node 111 is assigned to the control data timeslot field 510. Using this timeslot, the relay node 111 transmits control data 515 such as QoS information.

Also, timeslots for the relay node 111 are assigned to the application data timeslot field 520. In this example, FIG. 5B shows video data 524 of the first communication path, which is to be directly transmitted from the source node 100 to the destination node 110, and video data 525 of the second communication path, which is to be transmitted from the source node 100 to the relay node 111. Furthermore, FIG. 5B shows video data 526 of the second communication path, which is to be relayed by the relay node 111. In this manner, in FIG. 5B, a plurality of communication paths from the source node 100 to the destination node 110 are configured to include the relay node 111.

Processing for deciding communication paths when the relay node 111 is added will be described below with reference to the sequence chart shown in FIG. 6B. In the third embodiment as well, training processing for measuring QoS levels between the nodes is executed prior to transmission of application data as in the first embodiment.

In step S1100, the source node 100 transmits a training start instruction in which the source node 100 is set as a training sequence transmitting node to the relay node 111 and destination node 110. After that, the source node 100 transmits a training sequence as a given signal for a predetermined period while switching transmission directive angles of the antenna at predetermined timings in step S1105.

On the other hand, the relay node 111 and destination node 110, which received the training start instruction, receive the training signal and measure QoS levels while switching reception directive angles of the antennas at predetermined timings in steps S1110 and S1115. With this processing, the relay node 111 and destination node 110 can measure QoS levels in combinations of the respective transmission directive angles of the source node 100 and the respective reception directive angles of the self nodes. Upon completion of measurements of all QoS levels, the relay node 111 and destination node 110 transmit measurement results of the QoS levels to the source node 100 in steps S1120 and S1125.

In step S1130, the source node 100 saves the received measurement results of the QoS levels in QoS tables to update these tables. Then, the source node 100 transmits a training start instruction in which the relay node 111 is set as a training sequence transmitting node to the relay node 111 and destination node 110 in step S1135. After that, the relay node 111 transmits a training sequence as a given signal for a predetermined period while switching transmission directive angles of the antenna at predetermined timings in step S1140.

On the other hand, the destination node 110, which received the training start instruction, attempts to receive the training signal and to measure QoS levels while switching the reception directive angles of the antenna at predetermined timings in step S1145. With this processing, the destination node 110 can measure QoS levels in combinations of the respective transmission directive angles of the relay node 111 and the respective reception directive angles of the self node. Upon completion of measurements of all QoS levels, the destination node 110 transmits measurement results of the QoS levels to the source node 100 in step S1150.

In step S1155, the source node 100 saves the received measurement results of the QoS levels in a QoS table to update that table. Then, the source node 100 selects a plurality of communication paths used to transmit application data based on the QoS tables in step S1200. Details of the communication path selection algorithm will be described later. The source node 100 decides timeslot assignments and modulation methods to be applied in respective communication links according to the selected communication paths, and notifies the relay node 111 and destination node 110 of generated timeslot assignment information. After that, the source node 100, relay node 111, and destination node 110 start transmission of application data based on the timeslot assignment information.

A control operation upon selection of communication paths will be described below according to the algorithm shown in FIG. 7A. Assume that the number of communication paths selected by the source node 100 is 2, and the number of timeslots in the application data timeslot field is 8. Also, tables shown in FIG. 22 are used as the QoS tables.

In step S1205, modulation methods to be applied in respective communication links and the numbers of timeslots to be occupied are decided based on the QoS tables shown in FIG. 22 and the modulation method decision table shown in FIG. 9. In this example, since the relay node 111 is added, QoS tables of combinations of transmission angles of the source node 100 and reception angles of the relay node 111, and those of transmission angles of the relay node 111 and reception angles of the destination node 110 are added. As a result, as shown in a table shown in FIG. 23, four communication links are selected as candidates.

In step S1210, a table indicating the numbers of occupied slots of wireless communication paths, as shown in FIG. 24, is generated from the table of the communication links shown in FIG. 23. In this case, in addition to communication paths from the source node 100 which directly reach the destination node 110, a relay path from the source node 100, which reaches the destination node 110 via the relay node 111, is included like a communication path No. 3. Combinations of two communication paths are selected from these communication paths.

In step S1215, the number of occupied slots in an arbitrary combination of two communication paths of those shown in FIG. 24 is checked. As described above, since the number of timeslots in the application data timeslot field, is 8, a combination of communication paths which occupy nine or more timeslots is excluded from selection candidates. FIG. 25A shows a table indicating combinations of communication paths left as candidates, and indicates that a hatched combination of communication paths is excluded.

In step S1216, if combinations of communication paths shown in FIG. 25A include that of communication paths including overlapping communication links used, that combination is excluded. In this example, since there is no combination of overlapping communication paths, no combination is excluded.

In step S1220, for each of combinations of communication paths left as candidates, angle differences of transmission directive angles and reception directive angles used between the communication paths are calculated. As a result, as shown in a table of FIG. 25B, angle differences are calculated for all the combinations of communication paths.

In step S1225, a combination of communication paths having large angle differences is selected from those of communication paths shown in FIG. 25B. This processing is executed according to the flowchart of FIG. 7B as in the first embodiment. Assume that in this case, an angle difference threshold used in checking processes in steps S1300 and S1310 is 45°. This control operation is the same as that in the first embodiment, and a description thereof will not be repeated. As a result, a combination No. 3 (communication paths 2 and 3) in FIG. 25B is selected.

Figure 26A:
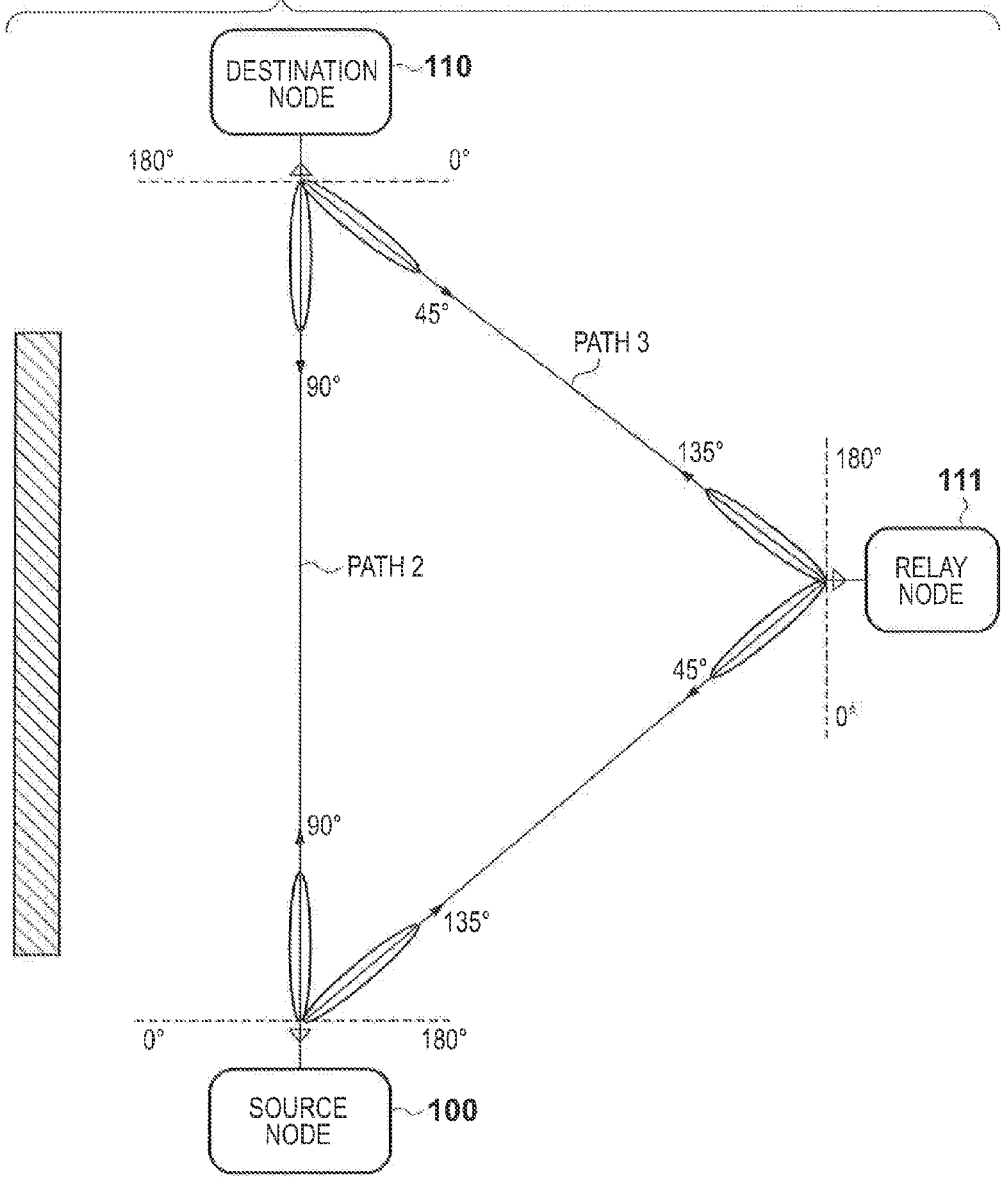
FIG. 26A shows finally selected communication paths.
Figure 26B:
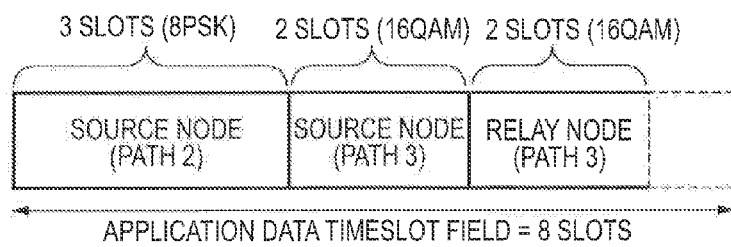
FIG. 26B shows timeslot assignments.

FIG. 26A shows the finally selected communication paths. FIG. 26B shows timeslot assignments in the application data timeslot field.

By applying the aforementioned algorithm, spatially separated communication paths can be selected in consideration of a data valid period even when the relay node is included.

[Fourth Embodiment]

Figure 27:
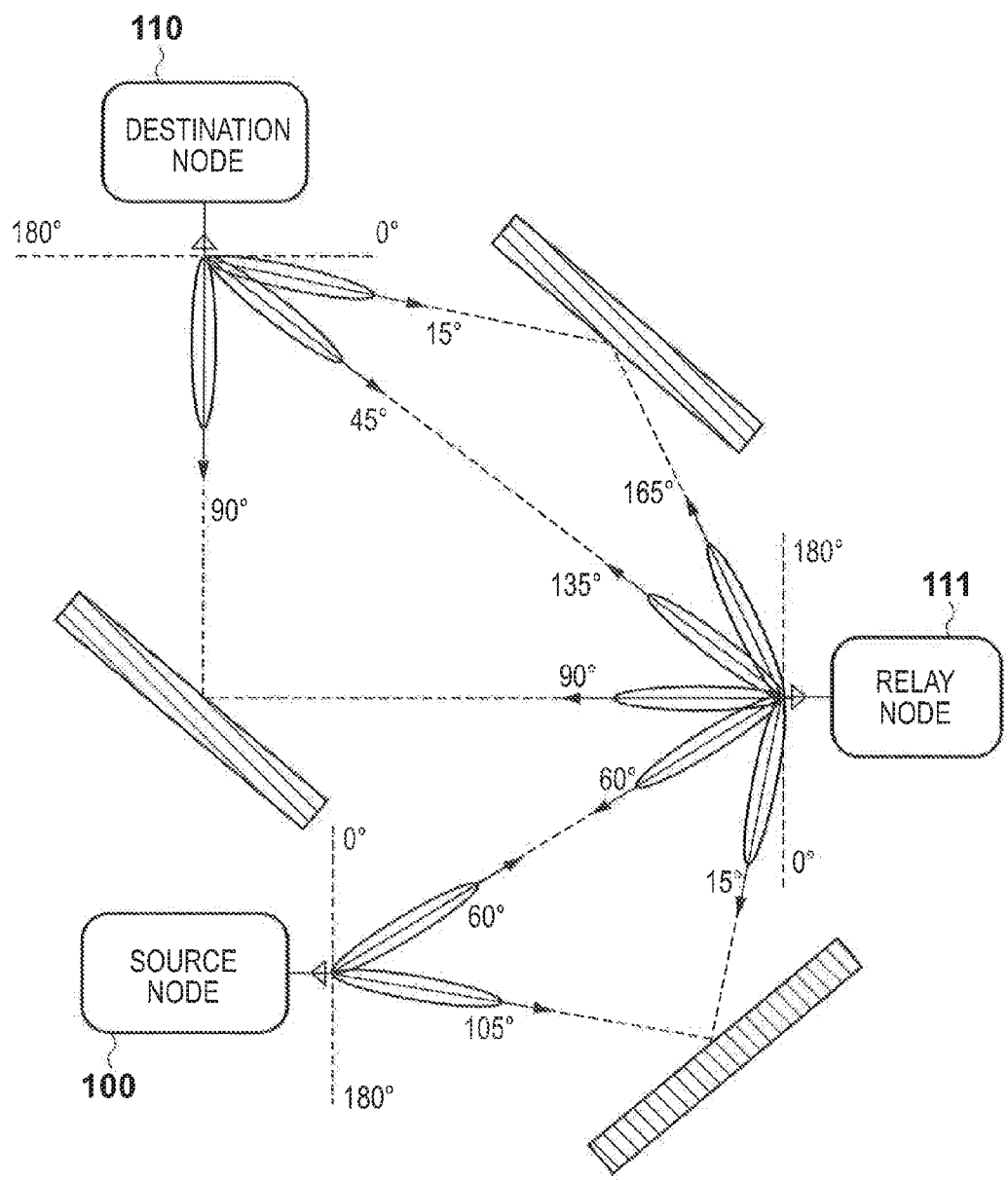
FIG. 27 is a view showing an example of a network configuration according to the fourth embodiment.

The fourth embodiment will explain a case in which the relay node 111 is included, as shown in the network configuration view of FIG. 27, and a combination of communication paths is selected in consideration of transmission and reception angles of the relay node 111 which configures communication paths. A control operation upon selection of communication paths will be described below according to the algorithm shown in FIG. 7A. Assume that the number of communication paths selected by the source node 100 is 2, and the number of timeslots in the application data timeslot field is 10. Also, tables shown in FIG. 28 are used as QoS tables.

In step S1205, modulation methods to be applied in respective communication links and the numbers of timeslots to be occupied are decided based on the QoS tables shown in FIG. 28 and the modulation method decision table shown in FIG. 9. As a result, as shown in a table shown in FIG. 29, five communication links are selected as candidates.

In step S1210, a table indicating the numbers of occupied slots of communication paths, as shown in FIG. 30, is generated from the table of the communication links shown in FIG. 29. Combinations of two communication paths are selected from these communication paths.

In step S1215, the number of occupied slots in an arbitrary combination of two communication paths of those shown in FIG. 30 is checked. As described above, since the number of timeslots in the application data timeslot field is 10, a combination of communication paths which occupy 11 or more timeslots is excluded from selection candidates. As a result, combinations No. 1 (communication paths 1 and 2), No. 4 (communication paths 1 and 5), No. 7 (communication paths 2 and 4), No. 8 (communication paths 2 and 5), and No. 13 (communication paths 4 and 5) are excluded.

Furthermore, in step S1216, if combinations of communication paths include those of communication paths including overlapping communication links used, those combinations are excluded except for one. For example, a combination No. 10 (communication paths 3 and 4) is configured by the same communication links as a combination No. 5 (communication paths 1 and 6), the combination No. 10 (communication paths 3 and 4) is excluded from candidates. As a result, communication path combinations No. 10 (communication paths 3 and 4) and No. 11 (communication paths 3 and 5) are excluded. FIG. 31A is a table showing combinations of communication paths left as candidates as a result of the processes in steps S1215 and S1216, and indicates that hatched combinations of communication paths are excluded.

In step S1220, for each of combinations of communication paths left as candidates, angle differences of transmission directive angles and reception directive angles used between the communication paths are calculated. As a result, as shown in a table of FIG. 31B, angle differences are calculated for all the combinations of communication paths. In this example, since there are a plurality of communication paths via the relay node 111, angle differences of transmission and reception directive angles of the relay node 111 are added.

In step S1225, a combination of communication paths having large angle differences is selected from those of communication paths shown in FIG. 31B. Details of this processing will be described below with reference to the flowchart shown in FIGS. 7C and 7D. Assume that in this case, an angle difference threshold used in checking processes in steps S1400, S1410, S1425, and S1435 is 45°.

It is checked in step S1400 if there are combinations in each of which an angle difference of transmission directive angles of the source node 100 between communication paths is equal to or larger than the threshold. In this example, since such combinations are found, the process advances to step S1405 to exclude combinations of communication paths in which the angle difference of the transmission directive angles is smaller than 45°. As a result, combinations No. 3 (communication paths 1 and 4), No. 5 (communication paths 1 and 6), No. 9 (communication paths 2 and 6), and No. 12 (communication paths 3 and 6) in FIG. 31B are left as selection candidates.

It is checked in step S1406 whether or not two or more combinations of communication paths are left as selection candidates. In this example, since four combinations are left as selection candidates, the process advances to step S1410. It is checked in step S1410 whether or not there are combinations in each of which an angle difference of reception directive angles of the relay node 111 between communication paths is equal to or larger than the threshold. As a result of checking, since such combinations are found, the process advances to step S1415 to exclude a combination of communication paths in which the angle difference of the reception directive angles is smaller than 45° from selection candidates. In this case, since all the combinations of communication paths have angle differences equal to or larger than 45°, there is no combination of communication paths to be excluded. As a result, the combinations No. 3 (communication paths 1 and 4), No. 5 (communication paths 1 and 6), No. 9 (communication paths 2 and 6), and No. 12 (communication paths 3 and 6) in FIG. 31B are left as selection candidates.

Next, it is checked in step S1416 whether or not two or more combinations of communication paths are left as selection candidates. In this example, since four combinations are left as selection candidates, the process advances to step S1425. If only one combination is left, the process advances to step S1420 to select that combination of communication paths, thus ending the processing.

It is checked in step S1425 if there are combinations in each of which an angle difference of transmission directive angles of the relay node 111 between communication paths is equal to or larger than the threshold. As a result of checking, since such combinations are found, the process advances to step S1430 to exclude combinations of communication paths in which the angle difference of the transmission directive angles is smaller than 45° from selection candidates. As a result, the combinations No. 3 (communication paths 1 and 4), No. 5 (communication paths 1 and 6), and No. 12 (communication paths 3 and 6) in FIG. 31B are excluded, and the combination No. 9 (communication paths 2 and 6) is left as a selection candidate.

Next, it is checked in step S1431 whether or not two or more combinations of communication paths are left as selection candidates. In this case, since only the combination No. 9 (communication paths 2 and 6) in FIG. 31B is left as a selection candidate, the process jumps to step S1455 to finally select the combination. No. 9 (communication paths 2 and 6) in FIG. 31B.

If two or more combinations of communication paths are left as selection candidates in step S1431, the process advances to step S1435 to check whether or not there are combinations in each of which an angle difference of reception directive angles of the relay node 111 between communication paths is equal to or larger than the threshold. As a result of checking, since such combinations are found, the process advances to step S1440 to exclude a combination of communication paths in which the angle difference of the reception directive angles is smaller than 45° from selection candidates. If no such combination is found, the process jumps to step S1445. It is checked in step S1445 whether or not two or more combinations of communication paths are left as selection candidates. If only one combination is left, the process advances to step S1450 to select that combination of communication paths. On the other hand, if two or more selection candidates of communication paths are left, the process advances to step S1455 to select a combination having the smallest number of occupied slots from the left combinations of communication paths. Note that in step S1450, the number of occupied slots is used as a criterion used to select a combination from a plurality of candidates. However, the present invention is not limited to this, and priority levels may be given based on other kinds of characteristic information of the communication paths. For example, as one method, totals of transmission powers of the source node 100 and relay node 111 upon transmission of data using respective communication paths may be calculated, and a combination of communication paths having a smaller total of transmission powers may be preferentially selected from those of communication paths having the number of occupied communication bands which is smaller than a predetermined threshold. As a result, an effect of reducing power consumption of the system can be obtained. As another method, a combination of communication paths having a larger total of QoS levels of the destination node 110 in the communication paths may be preferentially selected from those of communication paths having the number of occupied communication bands which is smaller than a predetermined threshold. As a result, an effect of eliminating communication errors can be obtained. As still another method, communication paths may be selected in turn from those having larger angle differences of the transmission directive angles of the source node and relay node and larger angle differences of the reception directive angles of the relay node and destination node. As a result, communication paths which are spatially separated by a larger distance can be selected, and a possibility of concurrently interrupting a plurality of communication paths by an obstacle can be reduced.

Figure 32A:
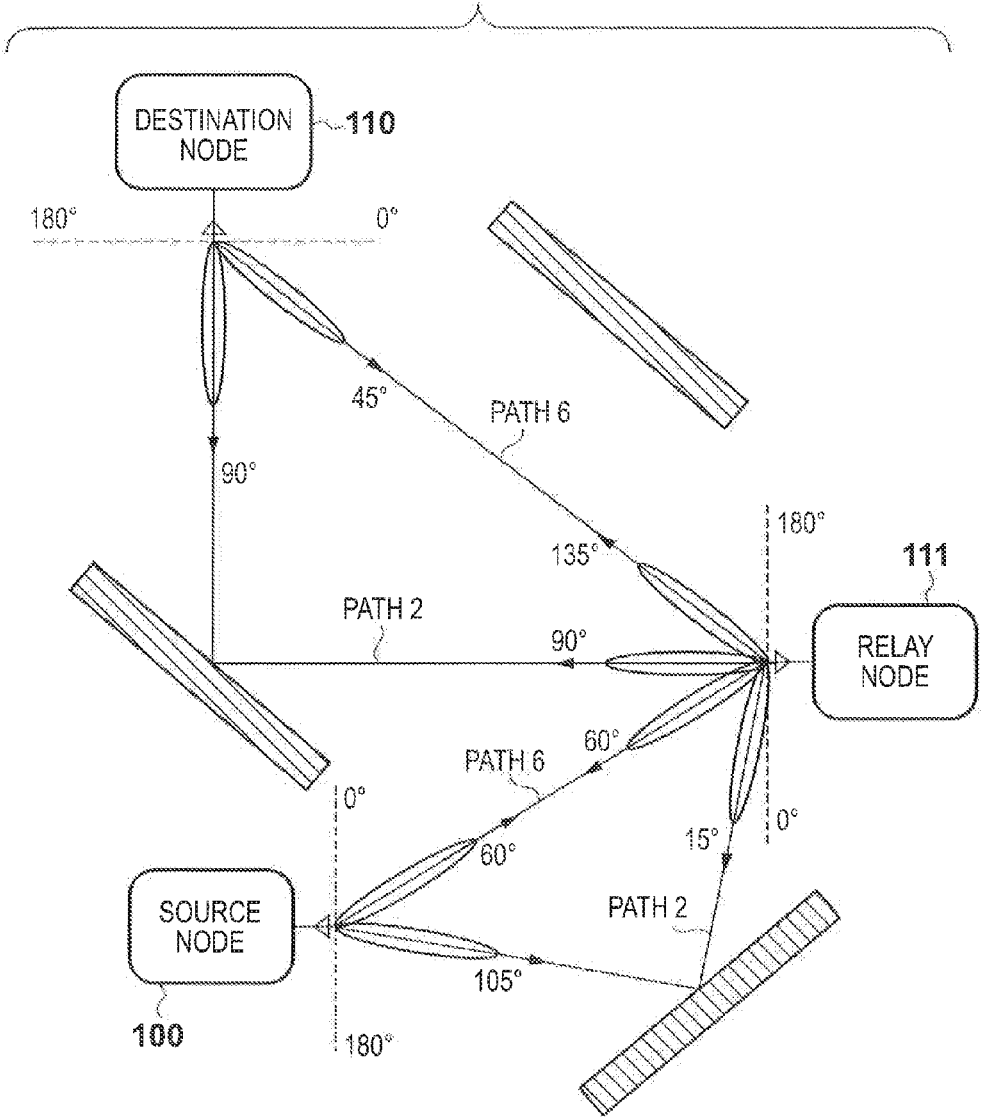
FIG. 32A shows finally selected communication paths.
Figure 32B:
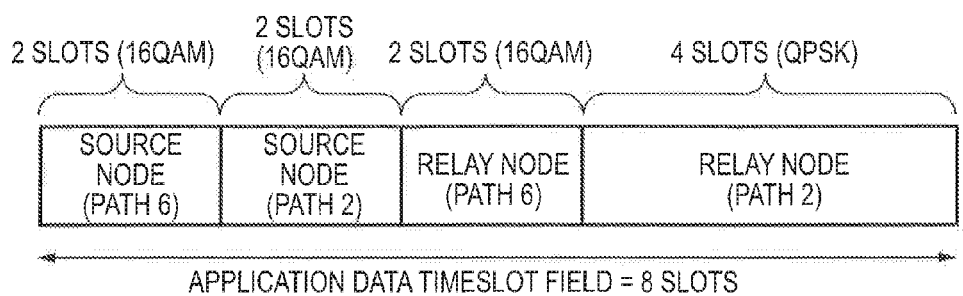
FIG. 32B shows timeslot assignments.

FIG. 32A shows the finally selected communication paths. FIG. 32B shows timeslot assignments in the application data timeslot field.

By applying the aforementioned algorithm, optimal communication paths can be selected in consideration of the transmission and reception angles of the relay node 111 in addition to those of the source node 100 and destination node 110.

Note that in the description of the example of the aforementioned embodiments, the source node serves as a selection apparatus which selects communication paths. Alternatively, a selection apparatus such as the destination node, relay node, and other nodes may select communication paths. In this case, the destination node and relay node notify the selection apparatus of measured QoS levels, and the selection apparatus can execute the selection processing of the aforementioned source node using information of QoS levels collected from the respective nodes.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-046970, filed Mar. 3, 2011 which is hereby incorporated by reference herein in its entirety.

What is claimed is:

1. A selection method of wireless communication paths in a node which selects wireless communication paths extending from a source node to a destination node, the method comprising:
    determining, by a processor, the amount of bandwidth occupied by wireless communication paths extending from the source node to the destination node; and
    selecting, by a processor, based on at least one of angle differences of transmission directive angles of the source node and of reception directive angles of the destination node between wireless communication paths, a combination of wireless communication paths from combinations of wireless communication paths in which the amount of bandwidth with respect to a combination of wireless communication paths is smaller than a predetermined threshold.

2. A selection apparatus for selecting wireless communication paths extending from a source node to a destination node, comprising:
    a determination unit that determines the amount of bandwidth occupied by wireless communication paths extending from the source node to the destination node; and
    a selection unit that selects, based on at least one of angle differences of transmission directive angles of the source node and of reception directive angles of the destination node between wireless communication paths, a combination of wireless communication paths from combinations of wireless communication paths in which the amount of bandwidth with respect to a combination of wireless communication paths is smaller than a predetermined threshold.

3. The apparatus according to claim 2, further comprising an acquisition unit that acquires an angle difference of directive angles between wireless communication paths in each of combinations of wireless communication paths,
    wherein the selection unit selects a combination of wireless communication paths from combinations in which the acquired angle difference is larger than a predetermined angle.

4. The apparatus according to claim 3, wherein the destination node comprises a directive antenna, reception directive angles of which are to be controlled, and
    wherein the acquisition unit acquires the angle difference of the directive angles between the wireless communication paths based on the reception directive angles of the destination node.

5. The apparatus according to claim 3, wherein the source node comprises a directive antenna, transmission directive angles of which are to be controlled, and
    wherein the acquisition unit acquires the angle difference of the directive angles between the wireless communication paths based on the transmission directive angles of the source node.

6. The apparatus according to claim 5, wherein the destination node comprises a directive antenna, reception directive angles of which are to be controlled, and
    wherein the acquisition unit acquires the angle difference of the directive angles between the wireless communication paths based on the reception directive angles of the destination node.

7. The apparatus according to claim 2, wherein the wireless communication paths include a wireless communication path via a relay node which comprises a directive antenna, at least ones of reception directive angles and transmission directive angles of which are to be controlled.

8. The apparatus according to claim 7, wherein the selection unit selects the combination of wireless communication paths based on at least ones of the reception directive angles and the transmission directive angles of the relay node.

9. The apparatus according to claim 2, wherein when there are a plurality of combinations of wireless communication paths in each of which a spatial distance between wireless communication paths is larger than a predetermined value, the selection unit selects a combination of wireless communication paths in which the amount of bandwidth occupied by wireless communication paths extending from the source node to the destination node is smallest.

10. The apparatus according to claim 2, wherein when there are a plurality of combinations of wireless communication paths in each of which a spatial distance between wireless communication paths is larger than a predetermined value, the selection unit selects a combination of wireless communication paths based on characteristic information of respective wireless communication paths.

11. The apparatus according to claim 10, wherein the characteristic information of the wireless communication path includes a Quality of Service level or transmission power of the wireless communication path.

12. A non-transitory storage medium storing a program for controlling a computer to execute a selection method of wireless communication paths in a node which selects wireless communication paths extending from a source node to a destination node, the method comprising:
    determining the amount of bandwidth occupied by wireless communication paths extending from the source node to the destination node; and
    selecting based on at least one of angle differences of transmission directive angles of the source node and of reception directive angles of the destination node between wireless communication paths, a combination of wireless communication paths from combinations of wireless communication paths in which the amount of bandwidth with respect to a combination of wireless communication paths is smaller than a predetermined threshold.

* * * * *